US008416953B2

(12) United States Patent
Nakano et al.

(10) Patent No.: US 8,416,953 B2
(45) Date of Patent: Apr. 9, 2013

(54) DATA PROTECTION SYSTEM THAT PROTECTS DATA BY ENCRYPTING THE DATA

(75) Inventors: Toshihisa Nakano, Neyagawa (JP); Motoji Ohmori, Hirakata (JP); Natsume Matsuzaki, Minou (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 1197 days.

(21) Appl. No.: 12/104,165

(22) Filed: Apr. 16, 2008

(65) Prior Publication Data

US 2010/0034388 A1 Feb. 11, 2010

Related U.S. Application Data

(62) Division of application No. 10/297,089, filed as application No. PCT/JP02/03055 on Mar. 28, 2002, now Pat. No. 7,395,425.

(30) Foreign Application Priority Data

Mar. 29, 2001 (JP) .................................. 2001-95730
Sep. 19, 2001 (JP) ................................. 2001-285608

(51) Int. Cl.
*H04L 9/00* (2006.01)
(52) U.S. Cl. ........ 380/277; 345/427; 370/230; 370/235; 370/254; 707/102; 707/3; 707/4; 707/999.1; 707/999.003; 707/694; 707/999.102; 707/999.004; 709/224; 713/189; 713/193; 713/163; 435/287.2; 715/206; 715/234; 715/966; 711/203; 369/53.29
(58) Field of Classification Search .................. 380/277, 380/227; 1/1
See application file for complete search history.

(56) References Cited

U.S. PATENT DOCUMENTS

| 4,794,528 | A | * | 12/1988 | Hirose et al. .......................... 1/1 |
| 5,265,102 | A | * | 11/1993 | Saito .............................. 714/743 |
| 5,301,284 | A | * | 4/1994 | Estes et al. .................... 711/203 |
| 5,365,551 | A | * | 11/1994 | Snodgrass et al. ............ 375/141 |

(Continued)

FOREIGN PATENT DOCUMENTS

| EP | 1253739 | 10/2002 |
| JP | 11-187013 | 7/1999 |

(Continued)

OTHER PUBLICATIONS

Canetti et al., "Efficient Communication-Storage Tradeoffs for Multicast Encryption", 1999.*

(Continued)

*Primary Examiner* — Krista M. Zele
*Assistant Examiner* — Ondrej Vostal
(74) *Attorney, Agent, or Firm* — Wenderoth Lind & Ponack, L.L.P.

(57) ABSTRACT

A data protection system includes terminals, and an encryption device that encrypts distribution data distributed to each terminal. Each terminal corresponds with one node on a lowest level of a tree structure having hierarchies. A data protection system excludes nodes on the lowest level, determines a plurality of combination patterns that include combinations of two or more of all four nodes that are reached one level below the node, decides an individual decryption key for each determined combination pattern, and decides an individual decryption key for each node on the lowest level. The data protection system prescribes nodes that are reached from the node on the lowest level and a terminal to the node on the highest level that is an invalid node. For invalid nodes, the data protection system designates an encryption key that corresponds to the decryption key determined in correspondence with the combination pattern that combines all nodes, excluding invalid nodes, and encrypts distribution data that uses each of the designated encryption keys.

24 Claims, 22 Drawing Sheets

U.S. PATENT DOCUMENTS

| | | | |
|---|---|---|---|
| 5,455,815 A * | 10/1995 | Ishida et al. | 369/53.29 |
| 5,754,938 A | 5/1998 | Herz et al. | |
| 5,907,620 A * | 5/1999 | Klemba et al. | 713/189 |
| 5,966,709 A * | 10/1999 | Zhang et al. | 1/1 |
| 5,970,490 A * | 10/1999 | Morgenstern | 1/1 |
| 6,049,878 A * | 4/2000 | Caronni et al. | 726/3 |
| 6,081,794 A | 6/2000 | Saito et al. | |
| 6,178,505 B1 * | 1/2001 | Schneider et al. | 713/168 |
| 6,204,844 B1 | 3/2001 | Fumarolo et al. | |
| 6,311,270 B1 * | 10/2001 | Challener et al. | 713/169 |
| 6,347,145 B2 | 2/2002 | Kato et al. | |
| 6,412,000 B1 * | 6/2002 | Riddle et al. | 709/224 |
| 6,493,637 B1 * | 12/2002 | Steeg | 702/19 |
| 6,591,299 B2 * | 7/2003 | Riddle et al. | 709/224 |
| 6,665,662 B1 * | 12/2003 | Kirkwood et al. | 1/1 |
| 6,738,878 B2 * | 5/2004 | Ripley et al. | 711/164 |
| 6,880,081 B1 * | 4/2005 | Itkis | 713/163 |
| 6,975,728 B1 * | 12/2005 | Eye et al. | 380/277 |
| 6,993,138 B1 * | 1/2006 | Hardjono | 380/281 |
| 7,007,018 B1 * | 2/2006 | Kirkwood et al. | 707/694 |
| 7,027,411 B1 * | 4/2006 | Pulsipher et al. | 370/254 |
| 7,043,024 B1 * | 5/2006 | Dinsmore et al. | 380/278 |
| 7,050,892 B1 | 5/2006 | Liebl et al. | |
| 7,103,185 B1 * | 9/2006 | Srivastava et al. | 380/277 |
| 7,103,607 B1 * | 9/2006 | Kirkwood et al. | 1/1 |
| 7,139,973 B1 * | 11/2006 | Kirkwood et al. | 715/206 |
| 7,269,257 B2 * | 9/2007 | Kitaya et al. | 380/45 |
| 7,346,169 B2 * | 3/2008 | Asano et al. | 380/278 |
| 7,404,076 B2 * | 7/2008 | Nakano et al. | 713/150 |
| 7,434,046 B1 * | 10/2008 | Srivastava | 713/163 |
| 7,483,887 B1 * | 1/2009 | Bruno et al. | 1/1 |
| 7,856,438 B2 * | 12/2010 | Fidaali et al. | 707/755 |
| 7,895,216 B2 * | 2/2011 | Longshaw et al. | 707/752 |
| 2002/0002466 A1 | 1/2002 | Kambayashi et al. | |
| 2002/0002613 A1 * | 1/2002 | Freeman et al. | 709/225 |
| 2002/0097878 A1 | 7/2002 | Ito et al. | |
| 2003/0018621 A1 * | 1/2003 | Steiner et al. | 707/3 |
| 2003/0182565 A1 * | 9/2003 | Nakano et al. | 713/193 |
| 2004/0010467 A1 | 1/2004 | Hori et al. | |
| 2005/0102294 A1 * | 5/2005 | Coldewey | 707/100 |
| 2005/0132186 A1 | 6/2005 | Khan et al. | |
| 2005/0225540 A1 | 10/2005 | Kawakami et al. | |
| 2006/0015514 A1 * | 1/2006 | Suga | 707/100 |
| 2006/0062394 A1 | 3/2006 | Kamijo | |
| 2006/0063527 A1 | 3/2006 | Ito | |
| 2009/0157721 A1 * | 6/2009 | Tal | 707/102 |
| 2009/0164485 A1 * | 6/2009 | Burke et al. | 707/100 |
| 2010/0240122 A1 * | 9/2010 | Ishibashi | 435/287.2 |

FOREIGN PATENT DOCUMENTS

| | | |
|---|---|---|
| JP | 11-239127 | 8/1999 |
| JP | 2000-99385 | 4/2000 |
| JP | 2001-500650 | 1/2001 |
| KR | 10-0270252 | 10/2000 |
| WO | 98/11487 | 3/1998 |

OTHER PUBLICATIONS

Balenson et al., "Key Management for Large Dynamic Groups: One-Way Function Trees and Amortized Initialization", 1999.*

Balenson et al., "Key Management for Large Dynamic Groups: One-Way Function Trees and Amortized Initialization", 2000.*

Kent et al., "Security Architecture for the Internet Protocol", 1998.*

Dijkerman et al., "Modeling and Estimation of Multi-Resolution Reciprocal Processes on N-ary Trees", Jun. 1994.*

Canetti et al., "Multicast Security: A Taxonomy and Some Efficient Constructions", 1999.*

McGrew et al., "Key Establishment in Large Dynamic Groups Using One-Way Function Trees", 1998.*

Wong et al., "Secure Group Communications Using Key Graphs", 2000.*

Balenson et al., "Key Management for Large Dynamic Groups: One-Way Function Trees and Amortized Initialization <draft-balenson-groupkeymgmt-oft-00.txt>", Feb. 1999.*

Balenson et al., "Key Management for Large Dynamic Groups: One-Way Function Trees and Amortized Initialization <draft-irft-smug-groupkeymgmt-oft-00.txt>", Aug. 2000.*

Dijkerman et al., "Modeling and Estimation of Multi-Resolution Reciprical Processes on N-ary Trees", 1994.*

Birget et al., "Hierarchy-Based Access Control in Distributed Environments", 2001.*

Padmavathi et al., "Storage Efficient Key Management Technique", 2005.*

Gotshalks, "Tree Definitions & Types of Trees", 2001.*

Gire et al., "Regular tree patterns: a unform formalism for update queries and functional dependencies in XML", 2010.*

Nishi et al., "The JUMP-1 Router Chip: A versatile router for supporting a distributed shared memory", 1996.*

International Search Report issued Sep. 12, 2002 in International (PCT) Application No. PCT/JP02/03055.

R. W. Dijkerman et al.: "Modeling and Estimation of Multi-Resolution Reciprocal Processes on N-Ary Trees", Conference Proceeding Article, Jun. 26, 1994, XP010214484, pp. 247-250.

M. Waldvogel et al. *The Versakey Framework: Versatile Group Key Management.* IEEE Journal on Selected Areas in Communications, vol. 17, No. 9, Sep. 9, 1999, pp. 1-18.

C. Kei Wong et al. *Secure Group Communications Using Key Graphs.* Department of Computer Sciences University of Texas at Austin, Austin, TX. Feb. 9, 1998, pp. 1-12.

Nakano et al., "Key management system for digital content protection". The 2001 Symposium on Cryptography and Information Security, Oiso, Japan, Jan. 23-26, 2001 (with English translation).

Matsuzaki et al., "DVD Content Scramble System" National Technical Report, vol. 43, No. 3, Jun. 1997, pp. 118-122. (With English Language Abstract).

European Summons to oral proceedings pursuant to Rule 115(1) EPC issued Dec. 14, 2012 in European Patent Application No. 02707213.1.

European Annex to the summons to oral proceedings Article 15(1) RPBA issued Dec. 14, 2012 in European Patent Application No. 02707213.1.

Waldvogel et al., "The VersaKey Framework: Versatile Group Key Management", IEEE Journal on Selected Areas in Communications, vol. 17, No. 9, Sep. 1999, pp. 1614-1631.

\* cited by examiner

ROOT INVALIDATION INFORMATION
"0000"

ROOT INVALIDATION INFORMATION
"1000"

FIG. 9

| KEY INFORMATION | | | |
|---|---|---|---|
| NODE ID 501 | INVALIDATION PATTERN 502 | KEY 503 | INVALIDATION INFORMATION 504 |
| 0-1 | 0000 | 0-1K0000 | 0000 |
|  | 0001 | 0-1K0001 |  |
|  | 0010 | 0-1K0010 |  |
|  | 0011 | 0-1K0011 |  |
|  | 0100 | 0-1K0100 |  |
|  | 0101 | 0-1K0101 |  |
|  | 0110 | 0-1K0110 |  |
|  | 1000 | 0-1K1000 |  |
|  | 1001 | 0-1K1001 |  |
|  | 1010 | 0-1K1010 |  |
|  | 1100 | 0-1K1100 |  |
| 1-1 | 0000 | 1-1K0000 | 0000 |
|  | 0001 | 1-1K0001 |  |
|  | 0010 | 1-1K0010 |  |
|  | 0011 |  |  |

DATA PROTECTION SYSTEM THAT PROTECTS DATA BY ENCRYPTING THE DATA

This is a divisional of U.S. patent application Ser. No. 10/297,089, filed Mar. 24, 2003, now U.S. Pat. No. 7,395,425 which is the National Stage of International Application No. PCT/JP02/03055, filed Mar. 28, 2002.

BACKGROUND OF THE INVENTION

1. Field of the Invention

The present invention relates to a data protection system that encrypts data and distributes the encrypted data to a plurality of terminals, and in particular, to a technique for determining keys for use in encryption and decryption of data.

2. Description of the Background Art

Against a background in recent years of developments in multimedia-related technology, the emergence of large-capacity recording mediums, and so on, systems have been developed that generate digital content of moving images, audio, and the like, store the digital content on large-capacity recording mediums such as optical disks, and distribute the recording mediums.

Digital content recorded on a distributed optical disk or the like is read by a terminal such as computer or a reproduction device, and becomes a target for reproduction, copying, etc.

In such a system, encryption techniques are typically used to protect the so-called copyright of the digital content, in other words, to prevent the illegal use of the digital content such as illegal copying.

Specifically, the system encrypts the digital content by using a particular encryption key, records the encrypted digital content on an optical disk or the like, and distributes the optical disk. Only a terminal that holds a decryption key that corresponds to the encryption key can obtain the original digital content by using the decryption key to decrypt data read from the optical disk, and perform reproduction and the like of the digital content.

Note that methods for encrypting digital content and recording the encrypted digital content on a recording medium include a method such as encrypting the digital content itself with an encryption key that corresponds to the decryption key held by the terminal. In another method, after digital content is encrypted with a particular key and recorded on a recording medium, and a decryption key that corresponds to the encryption key is encrypted with an encryption key that corresponds to the decryption key held by the terminal.

As one example of such a system, *National Technical Report* Vol. 43, No. 3, pp. 118-122, Engineering Administration Center, Matsushita Electric Industrial Company, Jun. 18, 1997 discloses a DVD (Digital Versatile Disk) right protection system. In this DVD right protection system, each DVD reproduction terminal for reproducing digital content recorded on a distributed DVD pre-stores a master key. The master key is determined by the manufacturer of the particular reproduction terminal. The reproduction terminal, which uses this master key in the decryption process, has a function of ultimately decrypting and reproducing the digital content recorded on the DVD. Note that a key group that has been encrypted with each manufacturer's master key and that is necessary for decrypting the digital content is recorded on the DVD.

Usually, the decryption key held by the terminal is kept secret. However, it is possible that analysis of the terminal by a dishonest party will lead to the decryption key being recognized and exposed.

There is a danger that once a decryption key held by a particular terminal is exposed, the dishonest party may create a terminal, software, or the like for decrypting digital content by using the exposed key, and make illegal copies of the digital content. Consequently, to protect the copyright of digital content, it will no longer be possible to encrypt and distribute digital content using an encryption key that corresponds to the exposed decryption key.

For example, taking into consideration a DVD reproduction terminal in the above-described DVD right protection system, it will no longer be possible to distribute digital content that has been encrypted by using a particular master key once that master key has been exposed.

As a result, after the master key is exposed, DVD manufacturers must use a different master key to encrypt digital content for distribution. However, a problem arises that since the DVD reproduction terminal that has been analyzed and numerous other DVD reproduction terminals made by the same manufacturer all hold the same master key, these DVD reproduction terminals are unable to reproduce digital content that is newly generated, recorded, and distributed on DVD after the exposure of the master key. In other words, if one DVD reproduction terminal is analyzed by a dishonest party, there will be numerous DVD reproduction terminals that in the future will not be able to use newly generated DVDs.

One method for solving this problem is to provide a separate decryption key for each DVD reproduction terminal, encrypt digital content or the key needed for decrypting the digital content with encryption keys that correspond to the decryption key held by all the DVD reproduction terminals, and record all the encrypted data obtained as a result on the DVD. According to this method, since it is possible to record, on the DVD, all encrypted data that is obtained by encrypting digital content by using each encryption key that corresponds to each unexposed decryption key that is held in the group of DVD reproduction terminals, even if the decryption keys of some DVD reproduction terminals are exposed, all DVD reproduction terminals except those whose keys have been exposed will still be able to use DVDs that are newly generated in the future.

However, there is a problem with this method in that when an enormous amount of DVD reproduction terminals are expected to be a target for the distribution of a DVD, an enormous amount of data must be recorded on the DVD.

SUMMARY OF THE INVENTION

In view of the above-described problems, the object of the present invention is to provide a data protection system that encrypts data such as digital content and keys which are necessary for decrypting the data, where the system uses an encryption technique that reduces, to a degree, the amount of encrypted data that is distributed, and that prevents, when a decryption key held by a particular terminal is exposed by analysis or the like by a dishonest party, the encrypted data from being decrypted correctly by the particular terminal, but enables the encrypted data to be decrypted by other terminals. Another object of the present invention is to provide a technique that is useful in the structure of such a data protection system.

In order to achieve the above-described objects, the data protection system of the present invention is a data protection system which includes three or more terminals, an encryption device, and an encryption key designation device, and which protects distribution data that is to be distributed to the terminals, according to the encryption device encrypting the distribution data. Each terminal stores a decryption key group assigned individually to the terminal according to a predetermined key assignment method, obtains an encrypted distribution data group that has been output from the encryption device, and uses a stored decryption key to decrypt encrypted distribution data. The predetermined key assignment method (a) determines two or more terminal groups, which are groups having two or more terminals as members, so that each of the terminals is a member of at least one of the terminal groups, and so that a relationship is satisfied such that any of the terminal groups that shares a same terminal as a member with another one or more of the terminal groups does not completely include the other one or more of the terminal groups sharing the same terminal as a member and is not completely included in the other one or more of the terminal groups sharing the same terminals as a member, (b) decides one or more decryption keys individually in correspondence with each terminal and each determined terminal group, and (c) assigns, to each terminal, the decryption key decided in correspondence with the terminal and all decryption keys decided in correspondence with all terminal groups that include the terminal. The encryption key designation device designates encryption keys, and includes: an invalid terminal a designation unit for designating one or more terminals as invalid terminals; an encryption key designation unit for designating, when all the decryption keys assigned to the terminals, other than decryption keys assigned to the one or more invalid terminals, are prescribed as valid decryption keys, and supposing that a procedure for selecting an assigned valid decryption key for the most terminals to which a selected valid decryption key is not assigned is repeated until all terminals have been assigned a selected valid decryption key, encryption keys that respectively correspond to all of the valid decryption keys that are selected as a result of the procedure. The encryption device includes an encryption unit for encrypting distribution data by successively using all the designated encryption keys to encrypt distribution data, generating the encrypted distribution data group, and outputting the generated encrypted distribution data group.

Here, the distribution data is either recorded on a recording medium and distributed, or distributed via a wired or wireless communication path. It is assumed that the data will ultimately reach the terminals.

Supposing that there are terminals 1, 2, and 3, the terminal groups determined by the above-described predetermined key assignment method are group A consisting of terminal 1 and terminal 2, group B consisting of terminal 1 and terminal 3, and group C consisting of terminal 2 and terminal 3. As a result of the predetermined key assignment method, the decryption keys stored by terminal 1 are terminal 1's unique decryption key, a decryption key A corresponding to group A, and a decryption key B corresponding to group B. Furthermore, the decryption keys stored by terminal 2 are terminal 2's unique decryption key, the decryption key A corresponding to group A, and the decryption key C corresponding to group C. The decryption keys stored by terminal 3 are terminal 3's unique decryption key, the decryption key B corresponding to group B, and the decryption key C corresponding to the group C. In this example, if terminal 2 is analyzed dishonestly and all of the decryption keys that terminal 2 holds are exposed, terminal 2 is designated as an invalid terminal, in other words a terminal to be invalidated, and the encryption key that is designated by the encryption key designation unit is the encryption key corresponding to the decryption key B.

Accordingly, if data is distributed to each terminal that has been encrypted by using the encryption key corresponding to the decryption key B, terminal 2 is not able to correctly decrypt the data, while terminal 1 and terminal 3 are able to correctly decrypt the data. To achieve the same object, it is also possible to distribute data that has been encrypted by using the encryption key corresponding to terminal 1's unique decryption key and the encryption key corresponding to terminal 3's unique decryption key. However, when compared to this alternative method, the method of using the encryption key corresponding to the decryption key B uses fewer encryption keys. The effect of this method is that the smaller the number encryption keys that are used, the amount of the encrypted data that is distributed becomes smaller.

In other words, according to the present invention, it is possible, in a data protection system that distributes the same encrypted data, such as the keys which are necessary to decrypt encrypted digital content, to a plurality of terminals to control the amount of encrypted data to be distributed. Furthermore, when a designated terminal has its decryption keys exposed, that designated terminal cannot correctly decrypt data, whereas other terminals can correctly decrypt the data.

Furthermore, the predetermined key assignment method may further perform the determining of terminal groups so that a terminal group exists that completely includes the plurality of terminal groups, and so that a relationship is satisfied such that any plurality of terminal groups within the plurality of terminal groups that shares a same terminal group as a member with another one or more of the terminal groups does not completely include the other one or more of the terminal groups sharing the same terminal as a member and is not completely included in the other one or more of the terminal groups sharing the same terminal as a member.

For example, if a decryption key AB is corresponded with terminal group AB that includes a terminal group A and a terminal group B, and a decryption key BC is corresponded with a terminal group BC that includes the terminal group B and a terminal group C, terminals that belong to terminal group A but do not belong to terminal groups B and C have the decryption key AB, but do not have the decryption key BC. Accordingly, even after a terminal that belongs to the terminal group A but does not belong to the terminal groups B and C is dishonestly analyzed, by encrypting data using the encryption key corresponding to the decryption key BC, it is at least possible for the terminals included in the terminal group BC, in other words, the terminals included in the terminal group B and the terminals included in the terminal group C, to correctly decrypt the data by using the decryption key BC. This makes it possible to encrypt the data by using fewer encryption keys in a way that many terminals can decrypt the data correctly.

Furthermore, the predetermined key assignment method may further perform the determining of the terminal groups so that each terminal group includes three or more terminals as members, and so that a terminal group exists that contains three or more terminal groups.

Accordingly, in distributing the same encrypted data to each terminal, the encryption of the data can be performed by using a key that is common to the three or more terminals. Therefore, the amount of data that is distributed can be reduced as compared to the case where each individual key is used in encryption.

Furthermore, the data protection system may include a key storage device that determines, when it is supposed that each terminal is corresponded with a node on a lowest level in an N-ary (N being a natural number equal to or greater than three) tree structure having a plurality of hierarchies, for each node other than the nodes on the lowest level, a plurality of combination patterns, for each one of N nodes that are reached from the node (parent node), that are combinations of two or more of the N nodes including the one of the N nodes, and that include a combination of all of the N nodes. In addition, the storage device decides an individual decryption key for each determined combination pattern and stores each decided decryption key in correspondence with the node (parent node), and further stores an individual decryption key in correspondence with each node in the lowest level. The data protection system may also include a decryption key determining device that executes the predetermined key assignment method, that determines the decryption key group that is assigned to each terminal, and that determines decryption keys to be assigned to each terminal. The decryption keys determined by the decryption key determining device are (a) from among the decryption keys stored in the key storage device in correspondence with each node on a same path, where the path is a path from the node corresponding to the terminal on the lowest level to a node on the highest level, excluding the node that corresponds to the terminal, all of the combination patterns that include a node that is one level below the node on the same path, and (b) the decryption key stored in the key storage device in correspondence with the terminal. The terminal groups have a one-to-one correspondence with the combination patterns, and each terminal group is a group whose members are all the terminals that correspond to all nodes on the lowest level that are reached from all the combined nodes in the corresponding combination pattern. Further, the encryption key designation unit, when the above tree structure is supposed, prescribes all nodes from which a node on the lowest level that corresponds to an invalid terminal is reached as invalid nodes, and performs encryption key designation processing first with a node on the highest level as a processing target node, and repeatedly performs the encryption key designation processing until all processing target nodes have been processed. The encryption key designation processing is performed on one processing target node at a time that has not been processed, and is processing that: (c) when a combination pattern exists that relates to a combination that includes all nodes, other than invalid nodes, one level below the processing target node, designates a decryption key that corresponds to the decryption key stored by the key storage device in correspondence with the combination pattern; (d) when a combination pattern does not exist that relates to a combination including all nodes, other than invalid nodes, one level below the processing target node, designates encryption keys stored in correspondence with all the nodes, other than the invalid nodes, by the key storage device in the level one level below if one level below is the lowest level, and if one level below is not the lowest level, newly sets all the nodes one level below, other than invalid nodes, as processing target nodes; and (e) if one or more invalid nodes exists one level below the processing target node, and if the one level below is not the lowest level, newly makes all of the one or more invalid nodes processing target nodes.

In this way, information such as a decryption key is corresponded with each node in the tree structure, and the decryption keys assigned to each terminal are determined based on the information and the position of each node in tree structure.

According to the method of designating the encryption key used in the encryption of distribution data, the above-described object is relatively easily achieved. In other words, a system is realized that achieves the object of controlling the amount of encrypted data to be distributed, and, when a designated terminal has its decryption keys exposed by a dishonest party, making that designated terminal unable to correctly decrypt the data, while other terminals can correctly decrypt the data.

Furthermore, when the tree structure is supposed, the determination of the plurality of combination patterns by the key storage device for each node, excluding the nodes on the lowest level, may be performed by prescribing combination patterns so that each combination pattern corresponds to one of all combinations of two or more of the N nodes that are one level below and are reached from the node (parent node), and the key storage device stores the determined decryption keys in correspondence with the node (parent node).

Accordingly, in a method in which the encryption keys to be used in the encryption of distribution data to be distributed to the terminals is designated by using an n-ary tree, the number of encryption keys can be kept relatively low. As a result, it is possible to make the amount of encrypted distribution data relatively small.

Furthermore, when the tree structure is supposed, the determination of the plurality of combination patterns by the key storage device for each node, excluding the nodes on the lowest level, may be performed by prescribing combination patterns so that each combination pattern corresponds to one of all combinations of all N of the nodes and (N−1) of the N nodes that are one level below and are reached from the node (parent node), and the key storage device stores the determined decryption keys in correspondence with the node (parent node).

Accordingly, in a method in which the encryption keys to be used in the encryption of distribution data to be distributed to the terminals is designated by using an n-ary tree, the number of decryption keys assigned to each terminal can be kept relatively low. As a result, it is possible to make the amount of data of the decryption key group that each terminal stores relatively small.

Furthermore, the encryption unit may output in correspondence, for each encryption key designated by the encryption key designation device, encrypted distribution data that is generated by encrypting the distribution data by using the designated encryption key, and encryption key node identification information for designating a position in the tree structure of the node that is corresponded by the key storage device with the decryption key corresponding to the encryption key. In addition, each terminal may store the decryption key that has been individually assigned thereto according to the predetermined key assignment method, in correspondence with decryption key node identifying information of the node with which the decryption key is corresponded, obtain the encrypted distribution data group and an encryption key node identification information group, and decrypt the encrypted distribution data that corresponds to encryption key node identification information that is stored by the terminal and that matches the decryption key node identification, by using the decryption key that corresponds with the decryption key node identification information.

Accordingly, after obtaining an encrypted distribution data group, which is distribution data that has been encrypted by using each of one or more encryption keys, each terminal can easily designate which of the decryption keys that it holds is to be used in decryption, by referring to the encryption key node identification information group. The time required to correctly decrypt is reduced as compared to a process in which each of the decryption keys is used successively by trial and error.

Furthermore, the encryption key designation device may include an encryption key storage unit for storing the corresponding encryption key of each decryption key that is stored by the key storage device, where the corresponding encryption key and the decryption key are different from each other.

Accordingly, even if a decryption key is exposed according to dishonest analyzing or the like of a terminal, it is possible to prevent a situation in which an encryption key that is used for encrypting data so that the data can be correctly decrypted by a plurality of terminals is dishonestly known and misused.

Furthermore, the generated encrypted distribution data group output by the encryption unit may be recorded on at least one data recording medium, and each terminal may read the encrypted distribution data from one of the at least one data recording mediums, and decrypt the encrypted distribution data.

Accordingly, data is encrypted and then may be recorded on an optical disk such as a DVD-ROM or another type of recording medium. Therefore, recording mediums having the same content as the recording medium can be mass produced and distributed to many people either for a charge or for free. People who receive one of the recording mediums can set their recording medium in their terminal and use the data recorded on the recording medium through the terminal.

Furthermore, the encryption unit may include: a content storage unit for storing content data that is a digital work; a random number generation unit for generating the distribution data that is a random number; a content encryption unit for encrypting the content data, by using the generated distribution data as a key, so as to generate encrypted content data. The encryption unit generates an encrypted distribution data group by encrypting the generated distribution data successively by using each of the encryption keys designated by the encryption key designation device, and recording the encrypted distribution data group and the generated encrypted content on the at least one data recording mediums. Each terminal may then read the encrypted content and the encrypted distribution data group from one of the at least one recording mediums, decrypt the encrypted distribution data, and use the resulting distribution data to decrypt the encrypted content data.

Accordingly, the keys which are necessary for decrypting encrypted digital content such as video and audio are encrypted, and data including the encrypted digital content and the encrypted keys is recorded on the recording medium. Therefore, recording mediums having the same content as the recording medium can be mass produced and distributed to many people either for a charge or for free. People who receive one of the recording mediums can set their recording medium in their terminal and use the data recorded on the recording medium through the terminal.

Furthermore, the data protection system may further include an encryption key designation information recording device for recording encryption key designation information that designates the encryption key designated by the encryption key designation device. In addition, each terminal includes: a random number generation unit for generating the distribution data that is a random number; a content storage unit for storing content data that is a digital work; an encryption key selection unit for reading the encryption key designation from the data recording medium, and selecting the encryption key designated by the encryption key designation information, from among the encryption key group that corresponds to the decryption key group stored by the terminal. The encryption unit encrypts distribution data by successively using all the encryption keys designated by the encryption keys designated by the encryption designation device to generate an encrypted distribution data group, and outputs the generated encrypted distribution data group.

Accordingly, in a system in which the user of a terminal can record arbitrary digital content such as video and audio on a recording medium such as a DVD-RAM, and distribute the recording medium, a designated terminal that has its decryption keys exposed through analysis by a dishonest party cannot correctly decrypt the data, whereas other terminals can correctly decrypt the data.

Furthermore, the generated encrypted distribution data group output by the encryption unit may be transmitted to each terminal, and each terminal may receive the transmitted encrypted distribution data group and decrypt the received encrypted distribution data group.

Accordingly, since distribution data is encrypted and transmitted to terminals, the terminals can easily use the received distribution data.

Furthermore, the decryption key determining device of the present invention is a decryption key determining device that determines decryption key groups for use in decryption to be individually assigned to at least three terminals that obtain encrypted data and decrypt the obtained encrypted data. The decryption key determining device includes a decryption key setting unit for: (a) determining two or more terminal groups, which are groups having two or more terminals as members, so that each of the terminals is a member of at least one of the terminal groups, and so that a relationship is satisfied such that any of the terminal groups that shares a same terminal as a member with another one or more of the terminal groups does not completely include the other one or more of the terminal groups sharing the same terminal as a member and is not completely included in the other one or more of the terminal groups sharing the same terminal as a member; and (b) corresponding an individual decryption key with each terminal and each determined terminal group. Further, the decryption key determining device includes a decryption key group assignment unit for determining, for each terminal, the corresponded decryption key and all the decryption keys corresponded with each terminal group in which the terminal is included, as a decryption key group to be assigned to the terminal.

Furthermore, the decryption key determining method of the present invention is a decryption key determining method that determines decryption key groups for use in decryption to be individually assigned to at least three terminals that obtain encrypted data and decrypt the obtained encrypted data. The decryption key determining method includes a terminal group determination step of determining two or more terminal groups, which are groups having two or more terminals as members, so that each of the terminals is a member of at least one of the terminal groups, and so that a relationship is satisfied such that any one of the terminal groups that shares a same terminal as a member with another one or more of the terminal groups does not completely include the other one or more of the terminal groups sharing the same terminal as a member and is not completely included in the other one or more of the terminal groups sharing the same terminal as a member. The decryption key determining method also includes a decryption key correspondence step of corresponding an individual decryption key with each terminal and each determined terminal group; and a decryption key group assignment step of determining, for each terminal, the corresponded decryption key and all the decryption keys corresponded with each terminal group in which the terminal is included, as a decryption key group to be assigned to the terminal.

Furthermore, the decryption terminal system of the present invention is a decryption terminal system including three or more terminals for obtaining encrypted data and decrypting the obtained encrypted data. Each terminal includes: a decryption key group storage unit for storing a decryption key group that has been individually assigned to the terminal according to a predetermined key assignment method; an encrypted data obtaining unit for obtaining encrypted data; and a decryption unit for decrypting the obtained encrypted data by using one of the stored decryption keys. The predetermined key assignment method (a) determines two or more terminal groups, which are groups having two or more terminals as members, so that each of the terminals is a member of at least one of the terminal groups, and so that a relationship is satisfied such that any of the terminal groups that shares a same terminal as a member with another one or more of the terminal groups does not completely include the other one or more terminal groups sharing the same terminal as a member and is not completely included in the other one or more of the terminal groups sharing the same terminal as a member, (b) decides one or more decryption keys individually in correspondence with each terminal and each determined terminal group, and (c) assigns, to each terminal, the decryption key decided in correspondence with the terminal and all decryption keys decided in correspondence with all terminal groups that include the terminal.

Furthermore, the decryption terminal of the present invention is a decryption terminal that obtains encrypted data and decrypts the obtained encrypted data. The decryption terminal includes: a decryption key group storage unit for storing a decryption key group that has been individually assigned to the terminal according to a predetermined key assignment method; an encrypted data obtaining unit for obtaining encrypted data; and a decryption unit for decrypting the obtained encrypted data by using one of the stored decryption keys. When it is supposed that there are three or more terminals including decryption the terminal, wherein the predetermined key assignment method, (a) determines two or more terminal groups so that decryption the terminal belongs to a plurality of terminal groups, each of which includes two or more terminals as members, and so that the plurality of terminal groups exist so as to satisfy a relationship that a terminal group that includes the decryption terminal as a member does not completely include another one of the two or more terminal groups and is not completely included in the other one of the two or more terminal groups, (b) decides one or more individual decryption keys in correspondence with the decryption terminal and in correspondence with each determined terminal group, and (c) assigns, to the decryption terminal, the one or more individual decryption keys decided in correspondence with the decryption terminal and the one or more individual decryption keys decided in correspondence with all the terminal groups that include the decryption terminal.

Accordingly, for example, when encrypted data is recorded on recording mediums and each recording medium is distributed to a terminal, not only can the amount of data recorded on the recording medium be suppressed, but also if a decryption key held by a designated terminal is exposed by a dishonest party, encryption can be performed so that the designated terminal cannot decrypt data correctly, while other terminals can decrypt data correctly.

Furthermore, the encrypted data obtaining unit may obtain the encrypted data by reading the encrypted data from a data recording medium.

Accordingly, by recording encrypted data on the data recording medium and distributing the data recording medium to the user of each terminal, the user of each terminal can use the data.

Furthermore, the data recording medium may have recorded thereon encryption key designation information for designating at least one encryption key. In addition, each terminal may further include: a random number generation unit for generating key data that is a random number; a content storage unit for storing digital content that is a digital work; an encryption key selection unit for reading the encryption key designation information from the data recording medium, and selecting, from the stored decryption key group, at least one decryption key that corresponds to the at least one encryption key designated by the encryption key designation information; a key data encryption unit for generating an encrypted data group by encrypting the generated key data successively by using all of the at least one selected encryption keys, and recording the encrypted key data group on the data recording medium; and a content encryption unit for generating encrypted content data by encrypting the stored content data by using the generated key data, and recording the encrypted content data on the data recording medium. The encryption data obtaining unit obtains the recorded encrypted key data and the recorded encrypted content data, and the decryption unit obtains key data by decrypting the obtained encrypted key data by using one of the stored decryption keys. In addition, and each terminal further includes a content decryption unit for decrypting the obtained encrypted content data by using the generated key data.

Accordingly, the user of each terminal can encrypt digital content such as audio and video, and record the encrypted digital content on a recording medium.

Furthermore, the encrypted data may have been transmitted from an external transmission device, and the encrypted data obtaining unit may obtain the encrypted data by receiving the encrypted data.

Accordingly, by receiving transmitted data such as digital content, each terminal can use the data easily.

Furthermore, the encryption key designation device of the present invention is an encryption key designation device that designates one or more encryption keys to be used in encrypting distribution data that is distributed to three or more terminals. The encryption key designation unit includes a decryption key setting unit for (a) determining two or more terminal groups, which are groups having two or more terminals as members, so that each of the terminals is a member of at least one of the terminal groups, and so that a relationship is satisfied such that any one of the terminal groups that shares a same terminal as a member with another one or more of the terminal groups does not completely include the other one or more of the terminal groups sharing the same terminal as a member and is not completely included in the other one or more of the terminal groups sharing the same terminal as a member, and (b) deciding one or more decryption keys individually in correspondence with each terminal and each determined terminal group. The encryption key designation unit also includes a decryption key group correspondence unit for corresponding, with each terminal, the decryption key decided in correspondence with the terminal and all decryption keys decided in correspondence with all terminal groups that include the terminal; an invalid terminal designation unit for designating one or more terminals as invalid terminals; and an encryption key designation unit for designating, when all the decryption keys corresponded with the terminals by the decryption key group correspondence unit, other than decryption keys assigned to the one or more invalid terminals, are prescribed as valid decryption keys, and supposing that a procedure for selecting an assigned valid decryption key for the most terminals to which a selected valid decryption key is not assigned is repeated until all terminals have been assigned a selected valid decryption key, encryption keys that respectively correspond to all of the valid decryption keys that are selected as a result of the procedure.

Furthermore, the encrypting device of the present invention is an encryption device for encrypting distribution data that is to be distributed to three or more terminals. The encryption device includes: a decryption key setting unit for (a) determining two or more terminal groups, which are groups having two or more terminals as members, so that each of the terminals is a member of at least one of the terminal groups, and so that a relationship is satisfied such that any one of the terminal groups that shares a same terminal as a member with another one or more of the terminal groups does not completely include the other one or more terminal groups sharing the same terminal as a member and is not completely included in the other one or more of the terminal groups sharing the same terminal as a member, and (b) deciding one or more decryption keys individually in correspondence with each terminal and each determined terminal group. The encrypting device also includes a decryption key group correspondence unit for corresponding, with each terminal, the decryption key decided in correspondence with the terminal and all decryption keys decided in correspondence with all terminal groups that include the terminal; an invalid terminal designation unit for designating one or more terminals as invalid terminals; an encryption key designation unit for designating, when all the decryption keys corresponded with the terminals by the decryption key group correspondence unit, other than decryption keys assigned to the one or more invalid terminals, are prescribed as valid decryption keys, and supposing that a procedure for selecting an assigned valid decryption key for the most terminals to which a selected valid decryption key is not assigned is repeated until all terminals have been assigned a selected valid decryption key, encryption keys that respectively correspond to all of the valid decryption keys that are selected as a result of the procedure; a encryption unit for encrypting the distribution data successively by using all designated encryption keys, so as to generate an encrypted distribution data group; and an output unit for outputting the generated encrypted distribution data externally.

Furthermore, the encryption key designation method of the present invention is an encryption key designation method that designates an encryption key to be used in encrypting distribution data that is distributed to three or more terminals. The encryption key designation method includes a terminal group determination step of determining two or more terminal groups, which are groups having two or more terminals as members, so that each of the terminals is a member of at least one of the terminal groups, and so that a relationship is satisfied such that any one of the terminal groups that shares a same terminal as a member with another one or more of the terminal groups does not completely include the other one or more terminal groups sharing the same terminal as a member and is not completely included in the other one or more of the terminal groups sharing the same terminal as a member. The encryption key designation method also includes a decryption key group correspondence step of corresponding one or more decryption keys individually in correspondence with each terminal and each determined terminal group; a decryption key group correspondence step of corresponding, with each terminal, in addition to the decryption key corresponded with the terminal, all decryption keys prescribed in correspondence with all terminal groups that include the terminal; an invalid terminal designation step of designating one or more terminals as invalid terminals; and an encryption key designation step of designating, when all the decryption keys corresponded with the terminals by the decryption key group correspondence step, other than decryption keys assigned to the one or more invalid terminals, are prescribed as valid decryption keys, and supposing that a procedure for selecting an assigned valid decryption key for the most terminals to which a selected valid decryption key is not assigned is repeated until all terminals have been assigned a selected valid decryption key, encryption keys that respectively correspond to all of the valid decryption keys that are selected as a result of the procedure.

Accordingly, for example, when encrypted data is recorded on recording mediums and each recording medium is distributed to a terminal, not only can the number of encryption keys used in encryption be kept to a relatively small number, but also if a decryption key held by a designated terminal is exposed by a dishonest party, encryption can be performed so that the designated terminal cannot decrypt data correctly, while other terminals can decrypt data correctly.

BRIEF DESCRIPTION OF THE DRAWINGS

FIG. 2 is function construction drawing of an encryption device 101 and a decryption device 103a;

FIG. 9 shows the structure of key information stored in a key information storage unit 301;

DETAILED DESCRIPTION OF THE INVENTION

First Embodiment

The following describes a data protection system according to a first embodiment of the present invention with reference to the drawings.

<Overall Construction>

Figure 1:
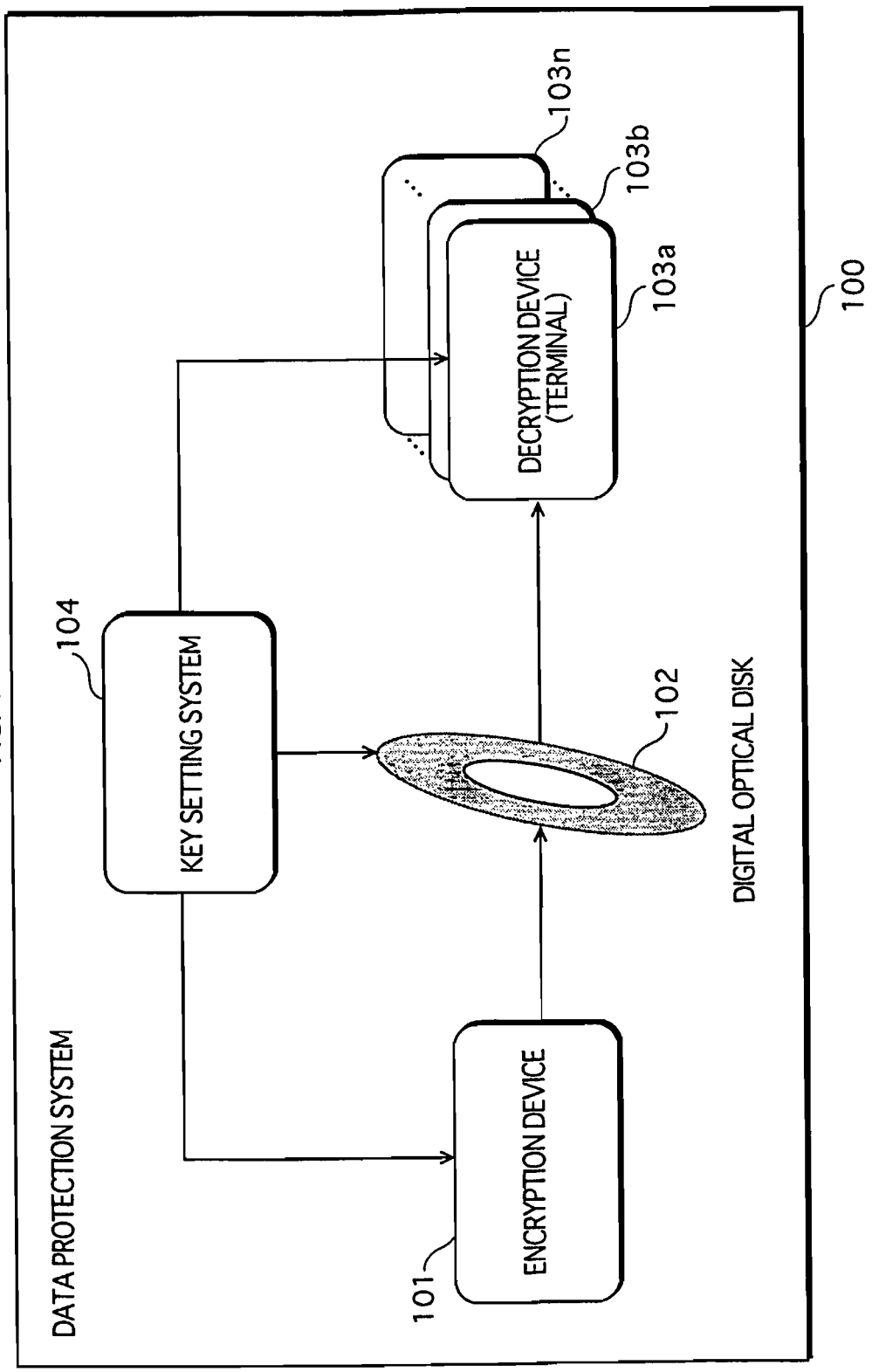
FIG. 1 shows an outline of the construction of a data protection system 100 according to a first embodiment of the present invention.

FIG. 1 shows an outline of the construction of a data protection system 100 according to the first embodiment of the present invention.

The data protection system 100, as shown in FIG. 1, is composed of an encryption device 101, a plurality of decryption devices (terminals) 103a to 103n, and a key setting system 104. The data protection system 100 is for encrypting digital content consisting of digital data including video, audio and so on, recording the encrypted digital content on one or more optical disks 102, which are DVD-ROMs or the like, and distributing the optical disks 102 to a plurality of terminals.

Here, the key setting system 104 is a system that determines an encryption key to be set in the encryption device 101 and individual decryption keys to be set in each of the decryption devices 103a to 103n.

The encryption device 101 holds the encryption key that has been designated by the key setting system 104, and is for encrypting content and recording the encrypted content on the optical disk 102. Note that it is assumed that one optical disk 102 is replicated to create multiple optical disks 102 having identical content.

Furthermore, the decryption devices 103a to 103n represent a large number of decryption terminals, for example one billion decryption terminals, and each decryption terminal holds a decryption key that has been individually determined by the key setting system 104. Each decryption terminal reads encrypted content from one of the optical disks 102, decrypts the encrypted content, and reproduces the obtained content.

Note that it is assumed that when the data protection system 100 is used for protecting the copyright of content, the key setting system 104 and the encryption device 101 are used by an organization that performs copyright protection. It is assumed that the decryption devices are used by general users. Furthermore, the key setting system 104 is basically used once for determining the decryption keys for each decryption device, and once for designating the encryption key to be used first. In addition, whenever it is judged that a decryption key held by a particular decryption device has been dishonestly exposed, the key setting system 104 is used for designating a new encryption key to be used in recording content to optical disks in the encryption device 101, with a purpose of preventing the particular decryption device whose decryption key has been exposed from decrypting encrypted content recorded on an optical disk.

The following describes the encryption device 101, the decryption devices 103a to 103n, and the key setting system 104 in more detail.

<Construction of the Encryption Device>

Figure 2:
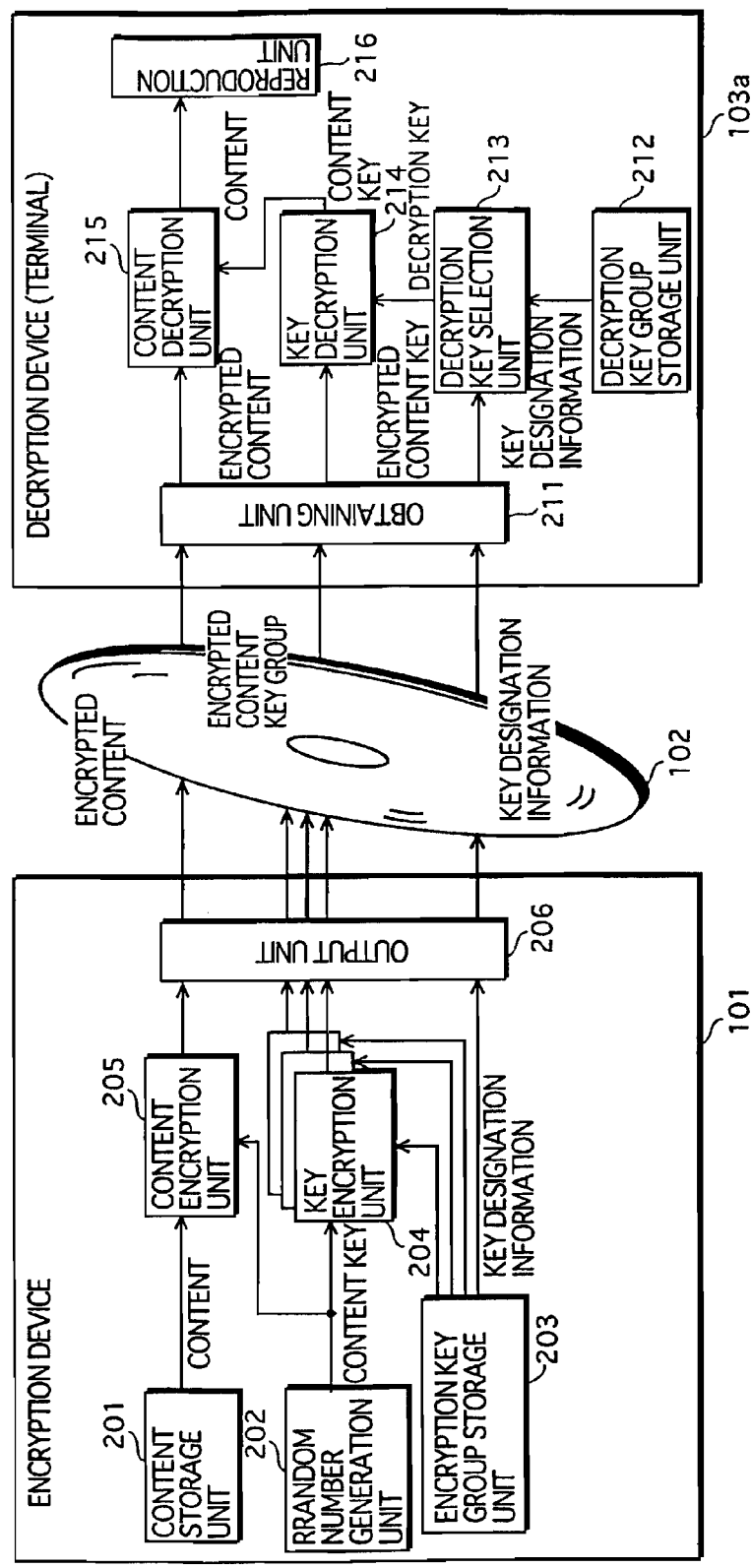

FIG. 2 is a function construction drawing of the encryption device 101 and the decryption device 103a.

As shown in FIG. 2, the encryption device 101 has a content storage unit 201, a random number generation unit 202, an encryption key group storage unit 203, a key encryption unit 204, a content encryption unit 205, and an output unit 206.

Here, the content storage unit 201 is a storage device such as a hard disk that stores content consisting of digital data including video, audio, etc.

The random number generation unit 202 has a function of generating a random number to be a key used in encrypting content (hereinafter "content key"). Note that the content key is 64-bit data made up of a random number.

The encryption key group storage unit 203 stores one or a plurality of encryption keys designated by the key setting system 104. Furthermore, the encryption key group storage unit 203 is a storage device such as a memory that stores key designation information which is used by the decryption device 103a to designate the decryption key that corresponds to the stored encryption key. Note that when an encryption key is newly designated by using the key setting system 104, the encryption key that was held by the encryption key group storage unit 203 before the new encryption key was designated is deleted, and only the newly designated encryption key is stored in the encryption key storage unit 203. The storage of this new encryption key and key designation information corresponding to the new encryption key may be performed, for example, by being input by an operator, or by being received from the key setting system 104.

The key encryption unit 204 has a function of encrypting, by using each encryption key stored in the encryption key storage unit 203, the content key obtained from the random number generation unit 202, and transmitting the resulting encrypted content keys to the output unit 206.

The content encryption unit 205 has a function of encrypting, by using the content key obtained from the random number generation unit 202, the content stored in the content storage unit 201, and conveying the resulting encrypted content to the output unit 206.

Furthermore, the output unit 206, which includes hardware that is capable of recording data on an optical disk, has a function of obtaining the key designation information from the encryption key group storage unit 203, and recording the key designation information, the encrypted content transmitted from the content encryption unit 205, and the encrypted content key transmitted from the key encryption unit 204 on the optical disk 102.

According to the recording by the encryption device 101, encrypted content, one or a plurality of encrypted content keys, and key designation information are recorded on the optical disk 102. Note that the number of encrypted content keys recorded on the optical disk 102 is equal to the number of encryption keys designated by the key setting system 104 and stored in the encryption key group storage unit 203.

The hardware of the encryption device 101 includes a CPU and a memory. All or some of the functions of the above-described random number generation unit 202, key encryption unit 204, content encryption unit 205, and output unit 206 are realized according to the CPU executing a control program that is stored in the memory.

<Construction of the Decryption Device>

The decryption device 103a is a terminal for reproducing optical disks. As shown in FIG. 2, the decryption device 103a has an obtaining unit 211, a decryption key group storage unit 212, a decryption key selection unit 213, a key decryption unit 214, a content decryption unit 215, and a reproduction unit 216.

Here, the obtaining unit 211 includes hardware that is capable of reading data from an optical disk. The obtaining unit 211 has a function of reading and conveying encrypted content, the encrypted content key, and the key designation information from the optical disk 102 to the content decryption unit 215, the key decryption unit 214, and the decryption key selection unit 213, respectively.

The decryption key group storage unit 212 is a storage device, such as a non-volatile memory, that stores a plurality of decryption keys that have been determined for the decryption device 103a by the key setting system 104, and so on. The decryption keys are stored, for example, during the decryption device manufacturing process.

The decryption key selection unit 213 has a function of judging, based on the key designation information conveyed from the obtaining unit 211, which of the decryption keys in the decryption key group stored in the decryption key group storage unit 212 can be used, and selecting one decryption key from among the keys decryption keys that can be used.

The key decryption unit 214 obtains, through the obtaining unit 211, the encrypted content key that can be decrypted by using the decryption key selected by the decryption key selection unit 213, and generates a content key by decrypting the obtained encrypted content key by using the selected decryption key.

The content decryption unit 215 has a function of decrypting, by using the content key generated by the key decryption unit 214, the encrypted content conveyed from the obtaining unit 211 to generate content, and conveying the generated content to the reproduction unit 216.

Furthermore, the reproduction unit 216 has a function of reproducing the content transmitted from the content decryption unit 215. Note that if the content treated by the data protection system 100 is, for example, moving image data compressed according to a compression method such as that specified by MPEG (Moving Picture Expert Group), it is necessary for the reproduction unit 216 to be, for example, a so-called MPEG decoder or the like and to include a function for expanding content and outputting a video signal.

The hardware of the decryption device 103a includes a CPU and a memory. All or some of the functions of the above-described obtaining unit 211, decryption key selection unit 213, key decryption unit 214, content decryption unit 215, and reproduction unit 216 are realized according to the CPU executing a control program that is stored in the memory.

Note that the other decryption devices 103b to 103n have an identical construction to the decryption device 103a. However, all or some of the contents stored in the decryption key group storage device 212 are different for each decryption device.

<Construction of the Key Setting System>

Figure 3:
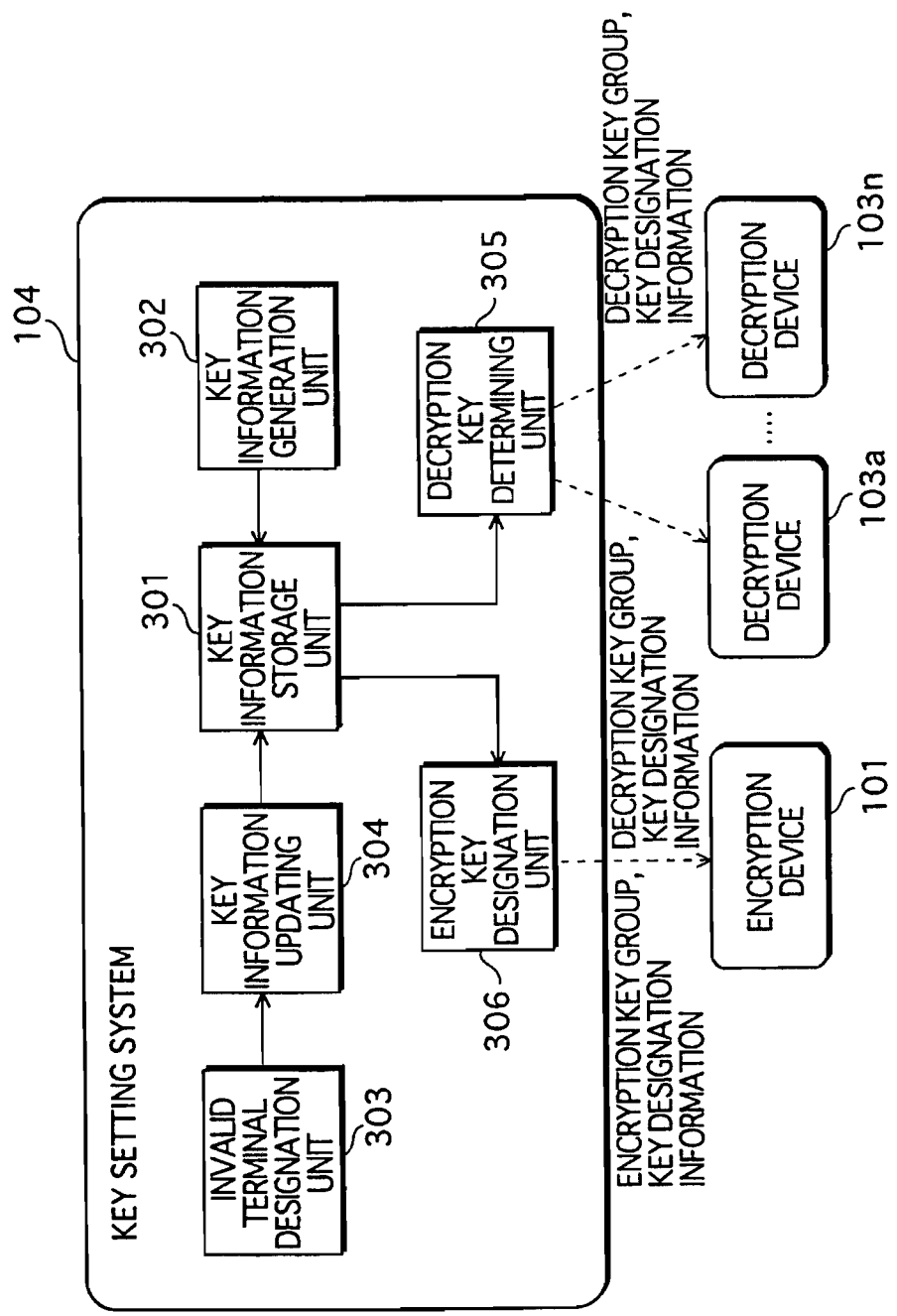
FIG. 3 is a function construction drawing of a key setting system 104.

FIG. 3 is a function construction drawing of the key setting system 104.

As shown in FIG. 3, the key setting system 104 has a key information storage unit 301, a key information generation unit 302, an invalid terminal designation unit 303, a key information updating unit 304, a decryption key determining unit 305, and an encryption key designation unit 306.

Here, the key information storage unit 301 is a storage device, such as a hard disk, for storing key information that is described later.

The key information generation unit 302 determines a tree-structure so that the decryption devices in the data protection system 100 correspond to nodes on a lowest level in a 4-ary tree, assigns one or a plurality of keys to each node in the tree structure, and generates key information that indicates information such as the one or a plurality of keys assigned to each node. Note that the key information is used for designating an encryption key and a decryption key, and includes invalidation information that serves as a basis for judging whether or not each of the keys assigned to a node can be used as an encryption key. This key information and the 4-ary tree are described in detail later.

The invalid terminal designation unit 303 has a function of receiving a specification of a decryption device whose decryption key has been exposed, from an operator via an input device such as a keyboard or a pointing device, and designating the specified decryption device as a terminal to be invalidated (hereinafter "invalid terminal"). An invalid terminal is a decryption device for which it is necessary to encrypt content in a way that the encrypted content cannot be decrypted correctly by that terminal.

The key information updating unit 304 has a function of updating the invalidation information in the key information stored in the key information storage unit 301, based on the invalid terminal designated by the invalid terminal designation unit 303.

The decryption key determining unit 305 has a function of determining a plurality of decryption keys to be set for each decryption terminal, based on the key information stored in the key information storage unit 301. Note that the decryption keys determined for each decryption device are stored along with information indicating the node corresponded therewith in the key information, in the decryption key group storage unit in the decryption device. The decryption keys and the information indicating the node correspondence are stored, for example, during the decryption device manufacturing process. Therefore, the key setting system 104 transmits information indicating the determined decryption keys and the correspondence between the decryption keys and the node to, for example, a manufacturing system used in manufacturing the decryption device.

Furthermore, the encryption key designation unit 306 has a function of designating one or a plurality encryption keys to be set in the encryption device, based on the key information stored in the key information storage unit 301, and outputs key designation information that serves as a basis for judging which decryption key is to be used for decryption by showing the correspondence between the designated encryption key and the node. This key designation information is output together with the designated encryption key.

This output denotes, for example, transmission to the encryption device 101, or recording on a portable recording medium. Note that when the encryption key designation unit 306 records the encryption key to a portable recording medium, in actual operation, it is necessary for an operator to have the contents of the recording medium copied to the encryption key group storage unit 203 in the encryption device 101.

<Key Information>

The following describes the key information that is generated by the key information generation unit 302 and stored in the key information storage unit 301.

First, the 4-ary tree is described.

Figure 4:
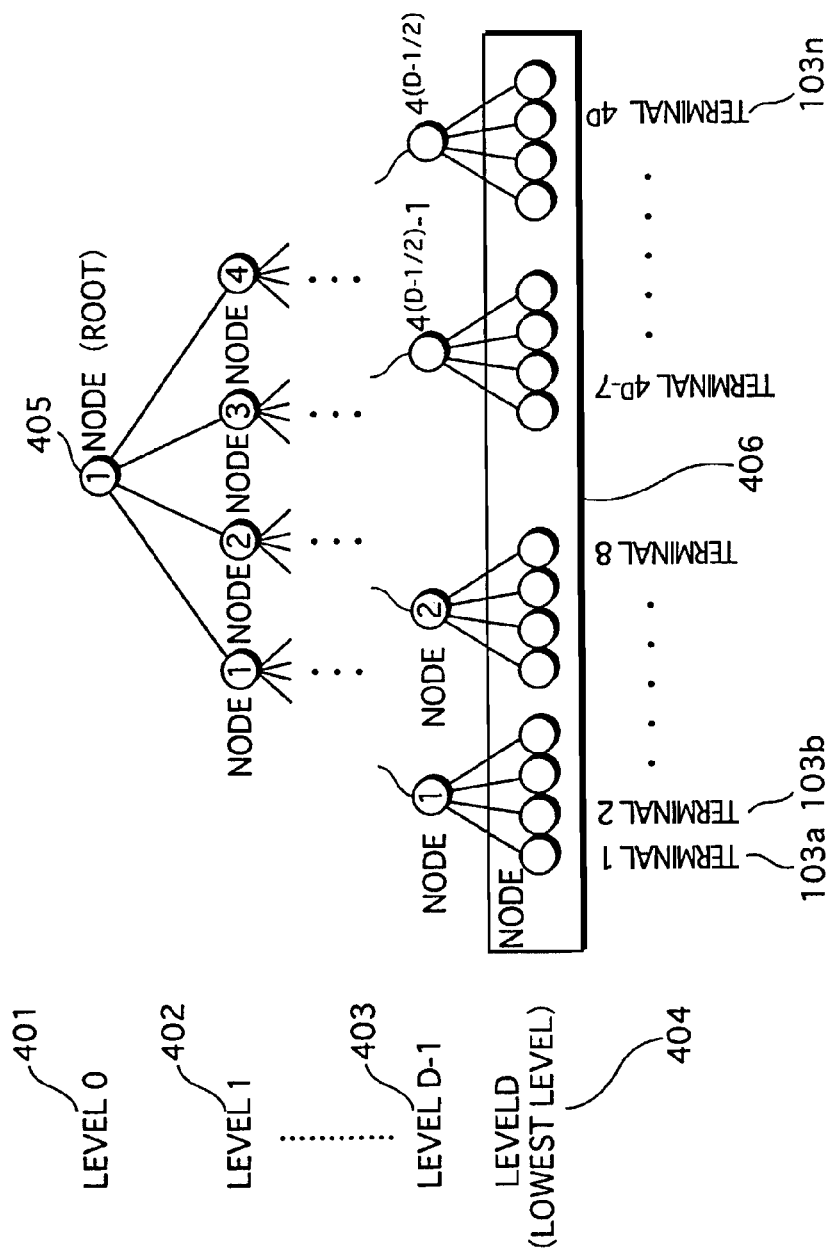
FIG. 4 shows a 4-ary tree structure.

FIG. 4 shows the 4-ary tree.

The 4-ary tree is structured so that each node that composes a node group 406 that is the lowest level of the 4-ary tree (hereinafter "leaf" is also used to describe each of the nodes on the lowest level) is in a one-to-one correspondence with one of the decryption devices (terminals). The 4-ary tree has a structure in which each node branches out into four nodes. Note that a structure in which each node branches out into n-nodes branches is called an n-ary tree. Therefore if each node in the tree structure branches out into four nodes, it is called a 4-ary tree. Furthermore, a node that branches out into four branches is called a parent node in relation to the four nodes that branch from the node, while the four nodes that branch from the parent node are called child nodes in relation to the parent node. Furthermore, a node 405 on the highest level is called a root.

When the number of decryption devices in the data protection system 100 is not a power of four, the number of nodes on the lowest level is the smallest power of four that is greater than the number of decryption devices. Here, for simplicity, it is assumed that the number of decryption devices and the number of nodes on the lowest level are the same.

The key information generation unit 302 prescribes the highest level in the tree structure in FIG. 4 as level 0, the level therebelow as level 1, and so on, successively increasing the number given to each level therebelow by 1. The level 403 above the lowest level is prescribed as level D−1, and the lowest level 404 is prescribed as level D. Each node on each level is prescribed a relative number in the level in order starting from 1. Accordingly, the relative number 1 on level D corresponds to the decryption device 103*a*, the relative number 2 on level D corresponds to the decryption device 103*b*, and the relative number 4 to the power D on level D corresponds to the last decryption device 103*n*.

Figure 5:
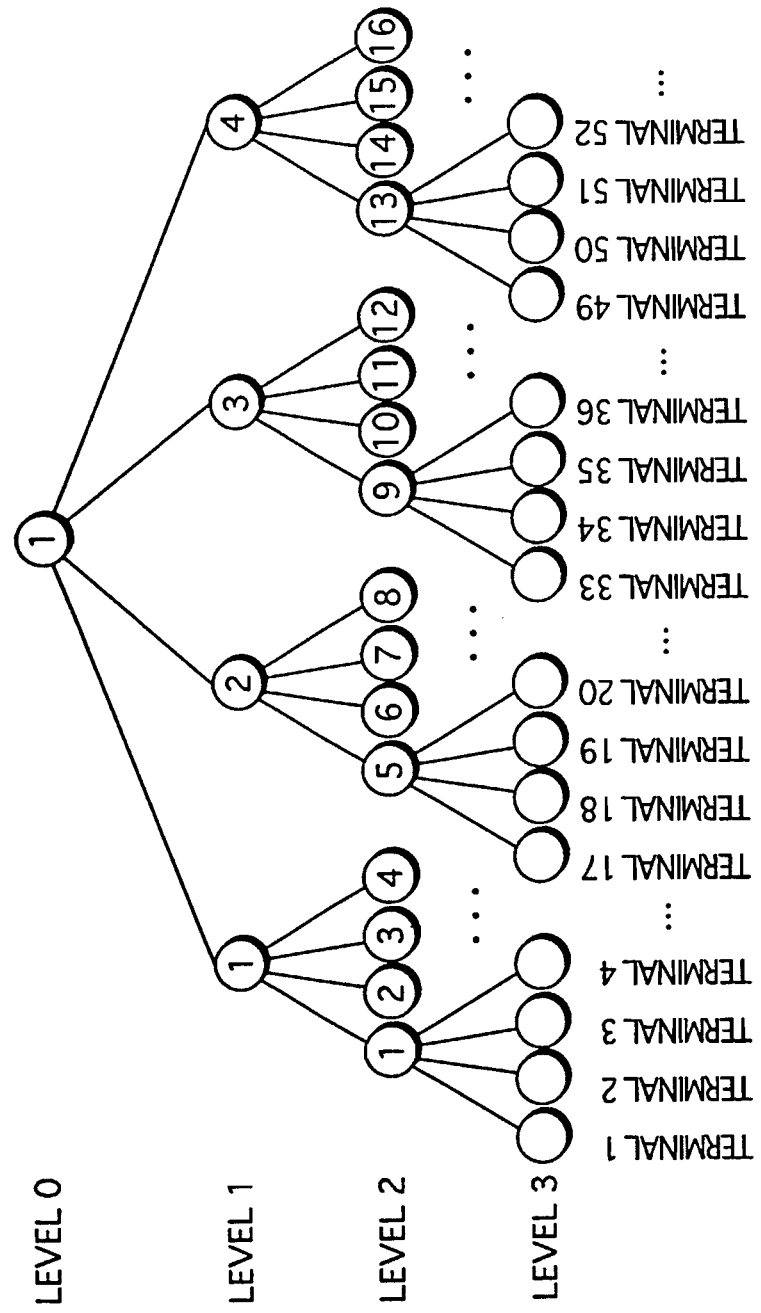
FIG. 5 shows an example of a 4-ary tree structure when there are 64 decryption devices.

FIG. 5 shows and example of a 4-ary tree when there are 64 decryption devices.

In the example in FIG. 5, since the 4-ary tree is constructed to have 64 leaves, the lowest level is level 3.

The following describes invalidation information that is prescribed in correspondence with each node.

The invalidation information of a node, supposing that the node is a parent node, is information combining flags that indicate whether or not the child nodes are invalid nodes, in order from the child node having the lowest relative number. A flag has a value of 1 if the corresponding child node is an invalid node, and a value of 0 if the corresponding child node is not an invalid node. Accordingly, if the four child nodes are not invalid nodes, the invalidation information of the parent node is "0000", whereas if the four child nodes are invalid nodes, the invalidation information of the parent node is "1111".

Note that it is assumed here that if the decryption device that corresponds to a leaf is an invalid terminal, the invalidation information of the leaf is "1111", and the invalidation information is "0000" if the decryption device is not an invalid terminal.

Note that "invalid node" denotes a leaf that corresponds to an invalid terminal, or a node that is reached from a leaf that corresponds to an invalid terminal. Therefore, it can also be said that an invalid node is a node whose corresponding invalidation information has a value other that "0000".

Here, a node being "reached" from another node denotes, supposing that there is a chain strung between each child node and its parent node, nodes that are connected by one or a plurality of chains in either an upwards direction or a downwards direction. Accordingly, in the tree-structure, a node on the lowest level that is reached by traversing one or a plurality of chains consistently from the node on the highest level is a node that is "reached" from the top node. Conversely, the node on the highest level is a node that is "reached" from the node on the lowest level. For example, the root can be reached from any leaf, and any leaf can be reached from the root, but one leaf cannot be reached from another leaf.

The value of the invalidation information of all the nodes is "0000" before a decryption key held by any decryption device is exposed, since there are no invalid terminals.

Figure 6:
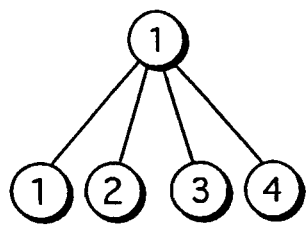
FIG. 6 shows an example of invalidation information of the root.
Figure 7:
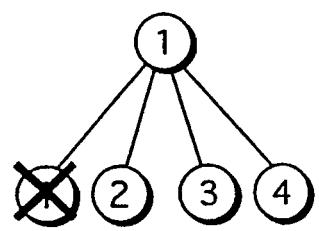
FIG. 7 shows an example of invalidation information of the root.

FIG. 6 and FIG. 7 show examples of invalidation information of the root.

The example in FIG. 6 shows the invalidation information of the root being "0000" when none of the child nodes of the root is invalid.

The example in FIG. 7, in which an invalid node is shown by a cross, shows invalidation information of the root being "1000" when the child node that corresponds to the relative number 1 is an invalid node.

The following describes the keys assigned to each node.

A set consisting of an encryption key and a decryption key that corresponds to the encryption key is assigned individually to each node by the key information generation unit 302. Note that each leaf is assigned one set of keys that are unique to the corresponding decryption device, and nodes other than leafs are assigned a plurality of sets of keys as described below.

Figure 8:
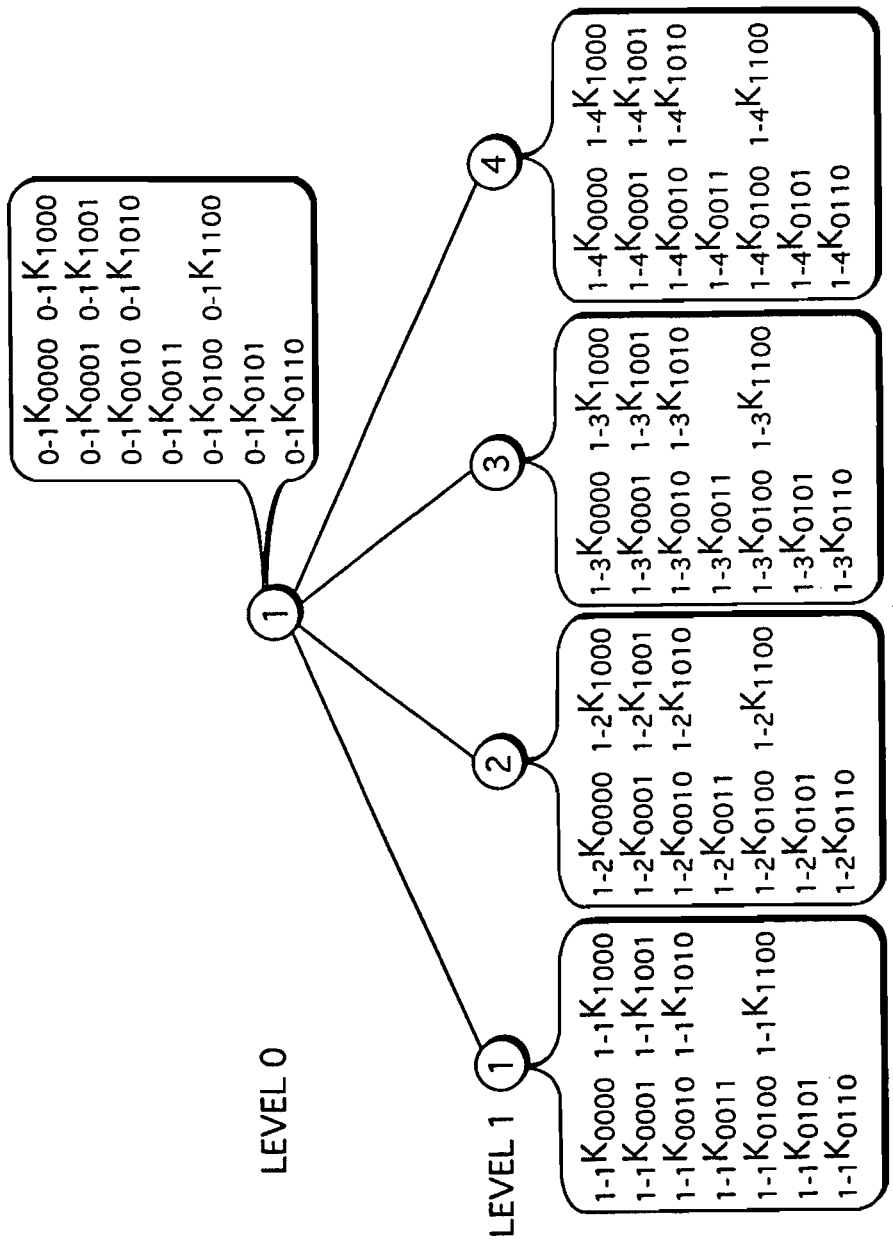
FIG. 8 shows keys assigned in correspondence with the nodes on level 0 and level 1 of a 4-ary structure.

FIG. 8 shows keys assigned corresponding to the nodes of level 0 and level 1 in a 4-ary tree.

In FIG. 8, an encryption key and the corresponding decryption key are expressed collectively as 0-1K0000, 0-1K0001, etc. for convenience.

Note that it is possible in the data protection system 100 to pre-determine the employment of either a system in which each encryption key and the corresponding decryption key have different values, or a system in which the each encryption key and the corresponding decryption key have the same value. When each encryption key and the corresponding decryption key have different values, for example, a decryption key expressed as 0-1K0000 and an encryption key expressed as 0-1K0000 have different values. When a system in which the encryption key and the decryption key have the same value is employed in the data protection system 100, an encryption key and a decryption key expressed as, for example, 0-1K0000 have the same value.

Hereinafter, an expression that a decryption key is assigned to each node, or that an encryption key is assigned to each node is used. However, in reality, when employing a system in which the decryption key and the encryption key have different values, the decryption key and the corresponding encryption key are assigned to each node, while when employing the system in which the decryption key and the corresponding decryption key have the same value, a key that is both the decryption key and the encryption is assigned to each node. Accordingly, the assigned decryption key and so on are set in the key information. Note that the encryption key and the decryption key are, for example, 64-bit data.

As shown in FIG. 8, nodes other than leaves are assigned 11 decryption keys.

Here, "invalidation pattern" denotes values among the possible values "0000", "1000", etc. that the invalidation information of a node can have in which the number of "ones" is less than (n−1) in an n-ary tree structure. Consequently, there are 11 types of invalidation patterns that have less than three "ones" in the four branches: "0000", "0001", "0010", "0011", "0100", "0101", "0110", "1000", "1001", "1010", and "1100". The nodes other than the leaves are assigned decryption keys of all the 11 invalidation patterns.

Here, a key having an invalidation pattern X and being for a node on a level A having a relative number B is expressed as "A-BKX".

Accordingly, "0-1K0000" shows a decryption key etc. corresponding to an invalidation pattern "0000" for a node on level 0 having a relative value 1.

FIG. 9 shows the structure of the key information stored in the key information storage unit 301.

As shown in FIG. 9, key information 500 is information for each node, in which a node ID 501, an invalidation pattern 502, a key 503, and invalidation information 504 are corresponded with each node.

The node ID 501 indicates a level identifying the position of the node in the tree structure and the relative number of the node. For example, the node ID of a node on level A having a relative number B is expressed as "A-B".

The invalidation pattern 502, as explained earlier, is a value in which the number of "ones" in the possible values of the invalidation information is less than three.

The key 503 is the decryption key and the encryption key assigned to a node identified by the corresponding node ID.

The invalidation information 504 is invalidation information about the node identified by the corresponding node ID. The initial value is "0000".

Note that there is no invalidation pattern corresponding to leaves in the key information. The key 503 for the leaf is one set of a decryption key and an encryption key.

<Key Assignment Processing>

The following describes the key assignment processing in the key setting system 104 performed by the decryption key determining unit 305 for determining decryption keys to be set in each of the decryption devices 103a to 103n. In other words, the following describes the key assignment processing for assigning a plurality of keys to each decryption device, after key information has been stored in the key information storage unit 301 by the key information generation unit 302.

Figure 10:
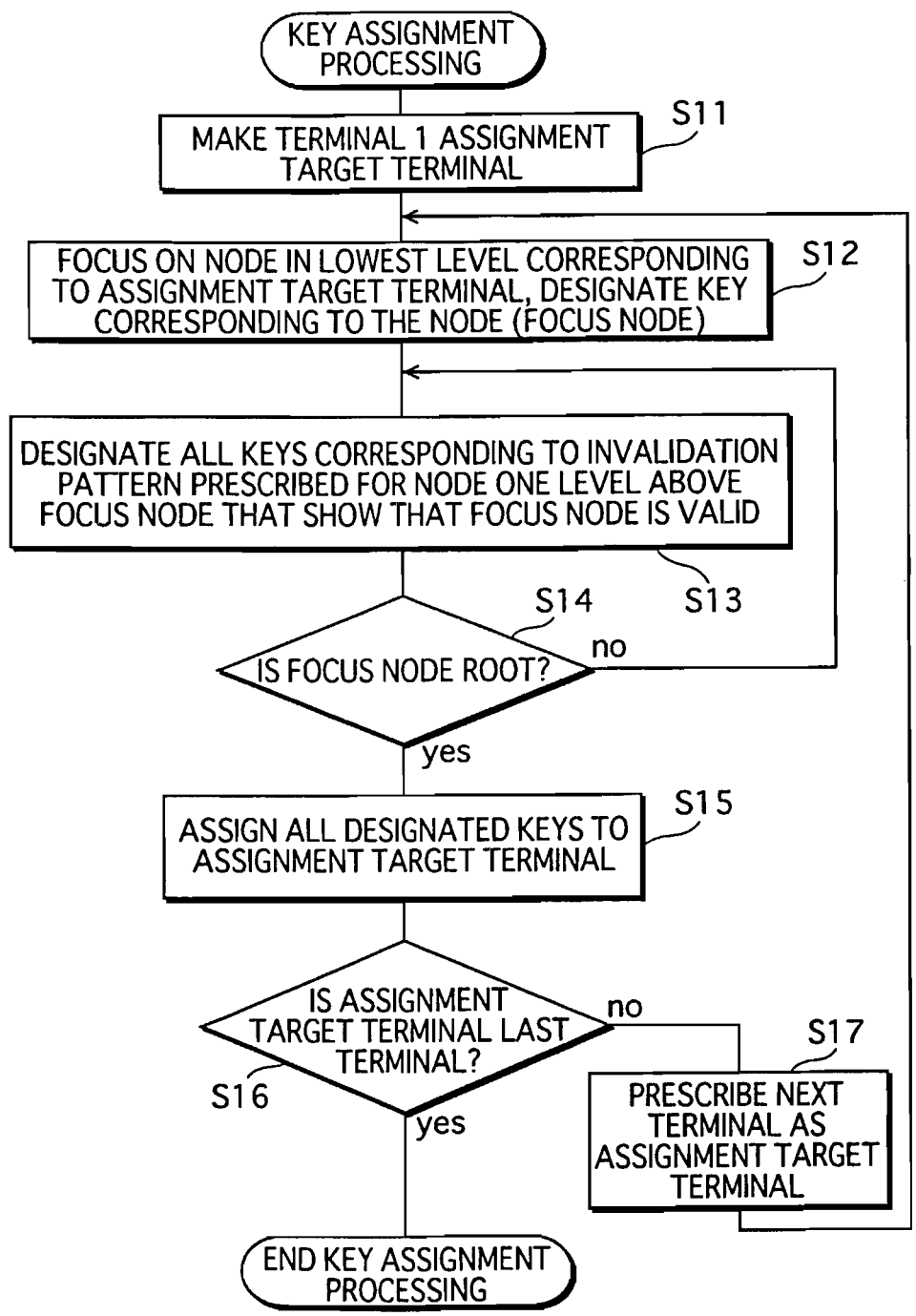
FIG. 10 is a flowchart showing key assignment processing executed by a decryption key determining unit 305.

FIG. 10 is a flowchart showing the key assignment processing executed by the decryption key determining unit 305.

The decryption key determining unit 305 first makes the decryption device (terminal) that corresponds to the leaf having the relative number 1 in the 4-ary tree a target of key assignment ("target terminal")(step S11). Then, by focusing on the leaf that corresponds to the target terminal, in other words the corresponding node on the lowest level, the decryption key determining unit 305 designates one decryption key to the node ("focus node") (step S12). Note that specifically "focusing on a node" denotes, for example, storing the address in the storage area of the information of that node in the key information in a variable for internal processing.

Next, the decryption key determining unit 305 designates all the decryption keys corresponding to the invalidation pattern set in the key information stored in the key information storage unit 301 for the node (parent node) that is one level above the focus node that indicate that the focus node is valid, in other words, that the focus node is not an invalid node, and newly prescribes the parent node as the focus node (step S13).

Continuing from step S13, the decryption key determining unit 305 judges whether or not the current focus node is the root (step S14), and if it is not the root, repeats the processing at step S13 until the current focus node is the root.

At step S14, if the current focus mode is the root, the decryption key determining unit 305 determines all the keys that were designated at steps S12 and S13 to be decryption keys to be set in the assignment target terminal (step S15). Then, the decryption key determining unit 305 judges whether or not the assignment target terminal is the last terminal, in other words, whether or not the assignment target terminal is the decryption terminal corresponding to the leaf having the highest relative number (step 16). If the assignment target terminal is the last terminal, the key assignment processing ends.

Furthermore, when it is judged at step S16 that the assignment target terminal is not the last terminal, the decryption key determining unit 305 newly prescribes the next terminal after the current assignment target terminal, in other words, the decryption device that corresponds to the leaf whose relative number is one higher than the leaf corresponding to the current assignment target terminal, as the assignment target terminal (step S17), and performs the processing at step S12.

Such a key assignment processing determines the decryption key group to be set for each decryption terminal. Each decryption device is constructed to hold its decryption key group as a result of being subjected to this key assignment processing.

Figure 11:
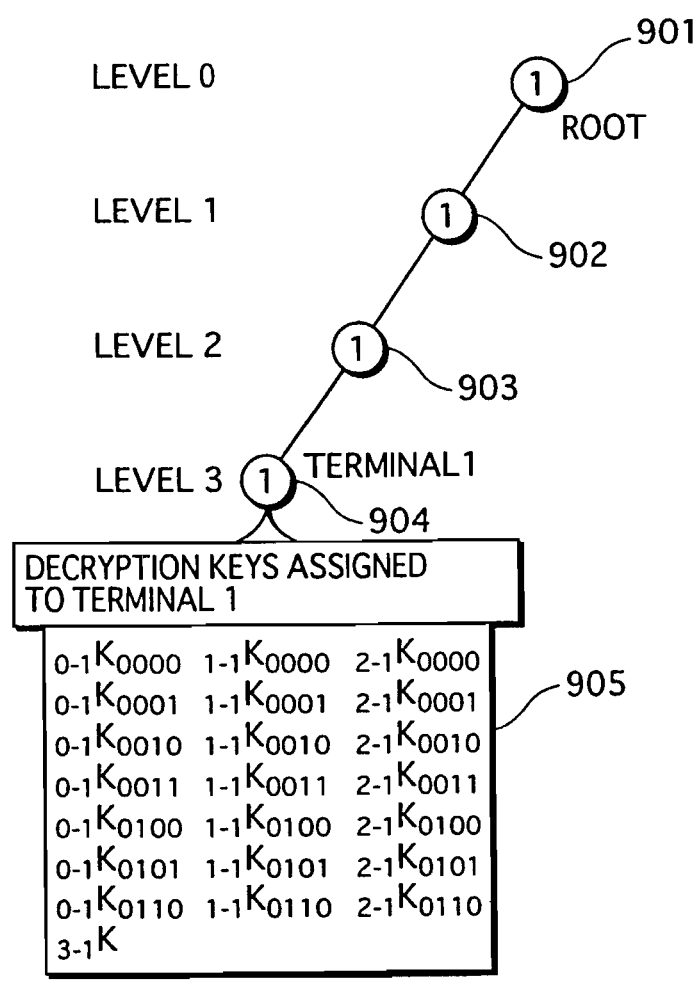
FIG. 11 shows a decryption key group 905 that is determined according to the key assignment process as the decryption keys which are assigned to a decryption terminal (terminal 1) that corresponds to a leaf on level 3 having a relative number 1, supposing that there are only 64 decryption devices.

FIG. 11 shows a decryption key group 905 that is determined according to the key assignment processing, as the decryption key group assigned to a decryption device (terminal 1) that corresponds to a leaf on level 3 having the relative number 1, supposing that there are only 64 decryption devices.

Note that, in FIG. 11, 3-1K expresses a decryption key assigned only to the leaf 904 on level 3 having the relative number 1.

Supposing there are only 64 decryption devices, as shown in FIG. 11, the terminal 1 is assigned a total of 22 decryption keys. The decryption keys assigned to the terminal 1 are 3-1K, 2-1K0000, 2-1K0001, 2-1K0010, 2-1K0011, 2-1K0100, 2-1K0101, 2-1K0110, 1-1K0000, 1-1K0001, 1-1K0010, 1-1K0011, 1-1K0100, 1-1K0011, 1-1K0110, 0-1K0000, 0-1K0001, 0-1K0010, 0-1K0011, 0-1K0100, 0-1K0101, and 0-1K0110. The decryption key 3-1K is the decryption key assigned to the leaf 904 on level 3 having the relative number 1. The other 21 decryption keys correspond to seven invalidation patterns "0000", "0001", "0010", "0011", "0100", "0101", and "0110" that indicate that the first child node is not invalid. Specifically, the decryption keys 2-1K0000, 2-1K0001, 2-1K0010, 2-1K0011, 2-1K0100, 2-1K0101, 2-1K0110 are from among the decryption keys assigned to the node 903 on level 2 having the relative number 1 and that is the parent node of the leaf 904. The decryption keys 1-1K0000, 1-1K0001, 1-1K0010, 1-1K0011, 1-1K0100, 1-1K0101, and 1-1K0110 are from among the decryption keys assigned to the node 902 on level 1 having the relative number 1 and that is the parent node of the node 903. The decryption keys 0-1K0000, 0-1K0001, 0-1K0010, 0-1K0011, 0-1K0100, 0-1K0101, and 0-1K0110 are from among the decryption keys assigned to the node 901 on level 0 having the relative number 1 on level 0 and that is the parent node of the node 902.

Accordingly, in this case, the 22 decryption keys assigned to the terminal 1 are stored in the decryption key group storage unit 212, for example, during the manufacturing process of the terminal 1.

Note that the invalidation patterns that correspond to each node, other than the leaves, are information joining a series of "ones" (if a child node is an invalid node) and "zeros" (if a child node is a valid node) in order starting from the child node having the lowest relative number in the level. Assigning decryption keys to invalidation patterns amounts to assigning decryption keys to a terminal group whose members are all the terminals corresponding to all the leaves that are reached from all the child nodes that are indicated to be valid nodes in the invalidation patterns. Therefore, each terminal is assigned a decryption key that is unique to the terminal as well as decryption keys that are assigned to all of the terminals, including that terminal, belonging in the group.

<Designation of Encryption Keys>

The encryption key designation unit 306 in the key setting system 104, when there are no invalid terminals, in other words, when none of the decryption keys has been exposed, designates the encryption key 0-1K0000 assigned to the root, i.e., the encryption key corresponding to the decryption key 0-1K0000, as the encryption key to be set in the encryption key group storage unit 203 in the encryption device 101.

Accordingly, the encryption device 101 stores, in the encryption key storage unit 203, the designated encryption key, and key designation information designating the decryption key 0-1K0000 that is assigned to the root of the tree-structure. The encryption key and the key designation information are, for example, received from the key setting system 104.

When recording content on the optical disk 102, the encryption device 101 encrypts the content key generated by the random number generation unit 202 in the key encryption unit 204, by using the encryption key stored in the encryption key group storage unit 203, and the output unit 206 records the encrypted content key and key designation information in correspondence with each other on the optical disk. Furthermore, the content encryption unit 205 encrypts the content stored in the storage unit 201, by using the content key, and the output unit 206 records the encrypted content on the optical disk 102.

The following describes invalidation information updating processing executed by the key information updating unit 304 in the key setting system 104.

When the invalid terminal designation unit 303 has designated an invalid terminal, the key information updating unit 304 causes the invalidation information to be "1111" in the key information stored in the key information storage unit 301 of the leaf corresponding to the invalid terminal so as to indicate that that leaf is an invalid node, and then performs the invalidation information updating processing to update the invalidation information corresponding to the nodes in the key information.

Figure 12:
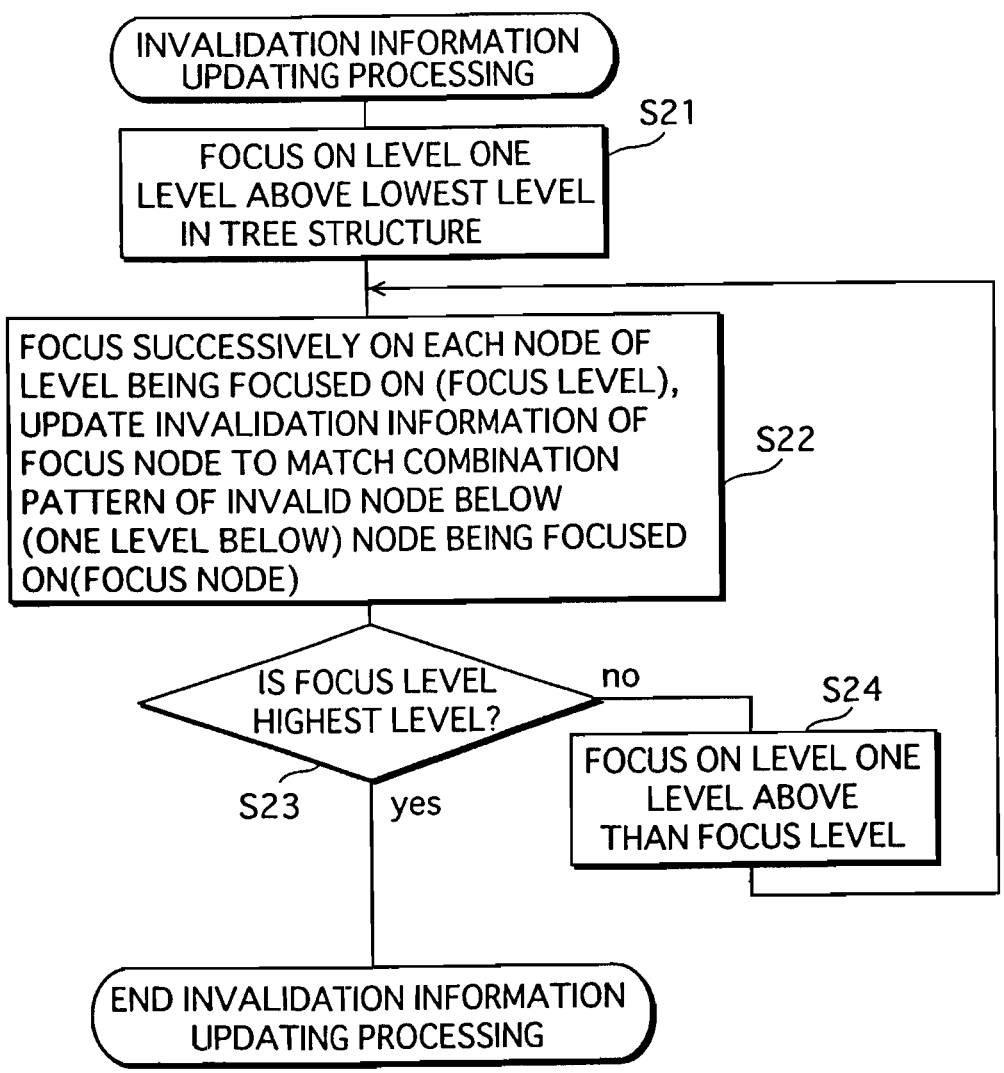
FIG. 12 is a flowchart showing invalidation information updating processing executed by a key information updating unit 304.

FIG. 12 is a flowchart showing the invalidation information updating processing executed by the key information updating unit 304.

First, the key information updating unit 304 focuses on the level in the 4-ary tree that is one level above the lowest level (step S21). In other words, if the lowest level is level D, the key information updating unit 304 focuses on level (D−1).

Next, the key information updating unit 304 successively focuses on each node in the level being focused on (the focus level) in order starting from the node having the lowest relative number, and updates the invalidation information of the node that is being focused on (focus node) so that the combination pattern of the invalidation information matches, for the four child nodes of the focus node (step S22). For example, if the child nodes, in order starting from the node with the lowest relative number, are "invalid node", "not invalid node", "not invalid node", and "not invalid node", the key information updating unit 304 makes the invalidation information of the focus node "1000".

After step S22, the key information updating unit 304 judges whether or not the current focus level is the highest level, in other words level 0 (step S23). If the current focus level is not the highest level, the key information updating unit 304 focuses on the level one above the focus level (step 24), and repeats the processing at step S22.

In the judgement at step S23, the key information updating unit 304 repeats steps S22 to S24 for each level until the current focus level is the highest level, and ends the invalidation information updating processing when the current focus level is the highest level.

As a result, the invalidation information for all the nodes in the 4-ary tree that are reached from the leaf corresponding to the invalid terminal have a value other than "0000".

The following describes key designation processing performed by the encryption key designation unit 306 to designate the encryption key group to be set in the encryption key group storage unit 203 in the encryption device 101, after the invalid terminal is designated by the invalid terminal designation unit 303 and the invalidation information in the key information is updated by the key information updating unit 304 in the key setting system 104.

Figure 13:
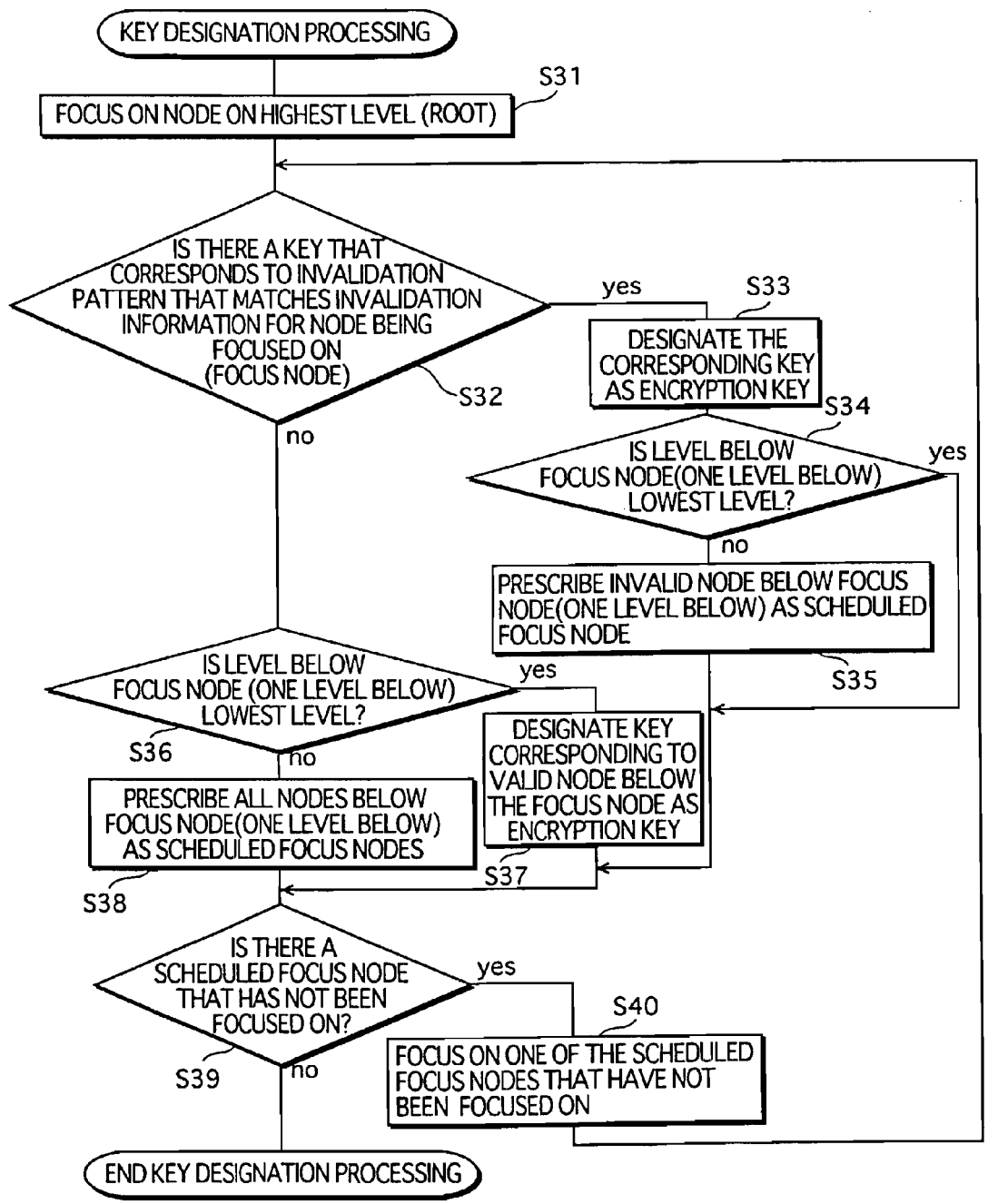
FIG. 13 is a flowchart showing key designation processing executed by an encryption key designation unit 306.

FIG. 13 is a flowchart showing key designation processing executed by the encryption key designation unit 306.

First, the encryption key designation unit 306 focuses on the node on the highest level in the 4-ary tree, in other words, the root (step S31).

Next, the encryption key designation unit 306 refers to the key information stored in the key information storage unit 301 for the node being focused on (the focus node) to judge whether or not there is an invalidation pattern that matches the invalidation information of the focus node (step S32). If there is a matching invalidation pattern, the encryption key designation unit 306 designates the encryption key corresponding to the invalidation pattern of the focus node as the encryption key to be set in the encryption device 101 (step S33). The encryption key designation unit 306 prescribes all the invalid nodes as scheduled focus nodes only when it is judged that the level below the focus node is not the lowest level in the tree structure (step S34), and when an invalid node exists among the child nodes of the focus node (step S35).

If it is judged at step S32 that there is no invalidation pattern that matches the invalidation information, the encryption key designation unit 306 judges whether or not the level that the child nodes of the focus node are on is the lowest level in the tree-structure (step S36), and if so, designates the encryption keys assigned to the child nodes of the focus node other than the leaf corresponding to the invalid terminal as encryption keys to be set in the encryption device 101 (step S37).

If it is judged at step S36 that the level that the child nodes of the focus node are on is not the lowest level, the encryption key designation unit 306 sets all the child nodes of the target node as scheduled focus nodes (step S38).

After steps S35, S37, and S38, or in step 34 after it has been judged that the level one below the focus node is the lowest level, the encryption key designation unit 306 judges whether or not there are any scheduled focus nodes that have not yet been focused on (step S39). If there are any scheduled focus nodes that have yet to be focused on, the encryption key description unit 306 newly focuses on one of the schedule focus nodes (step S40), and returns to the judgement processing at step S32.

Furthermore, at step S39, when it is judged that there are no scheduled focus nodes that have not yet been focused, the encryption key designation unit 306 ends the key designation processing.

As a result of the key designation processing, all the encryption keys designated by step S33 or step S37 are output from the encryption key designation unit 306 together with the key designation information, and are stored in the encryption key storage unit 203 of the encryption device 101.

Figure 14:
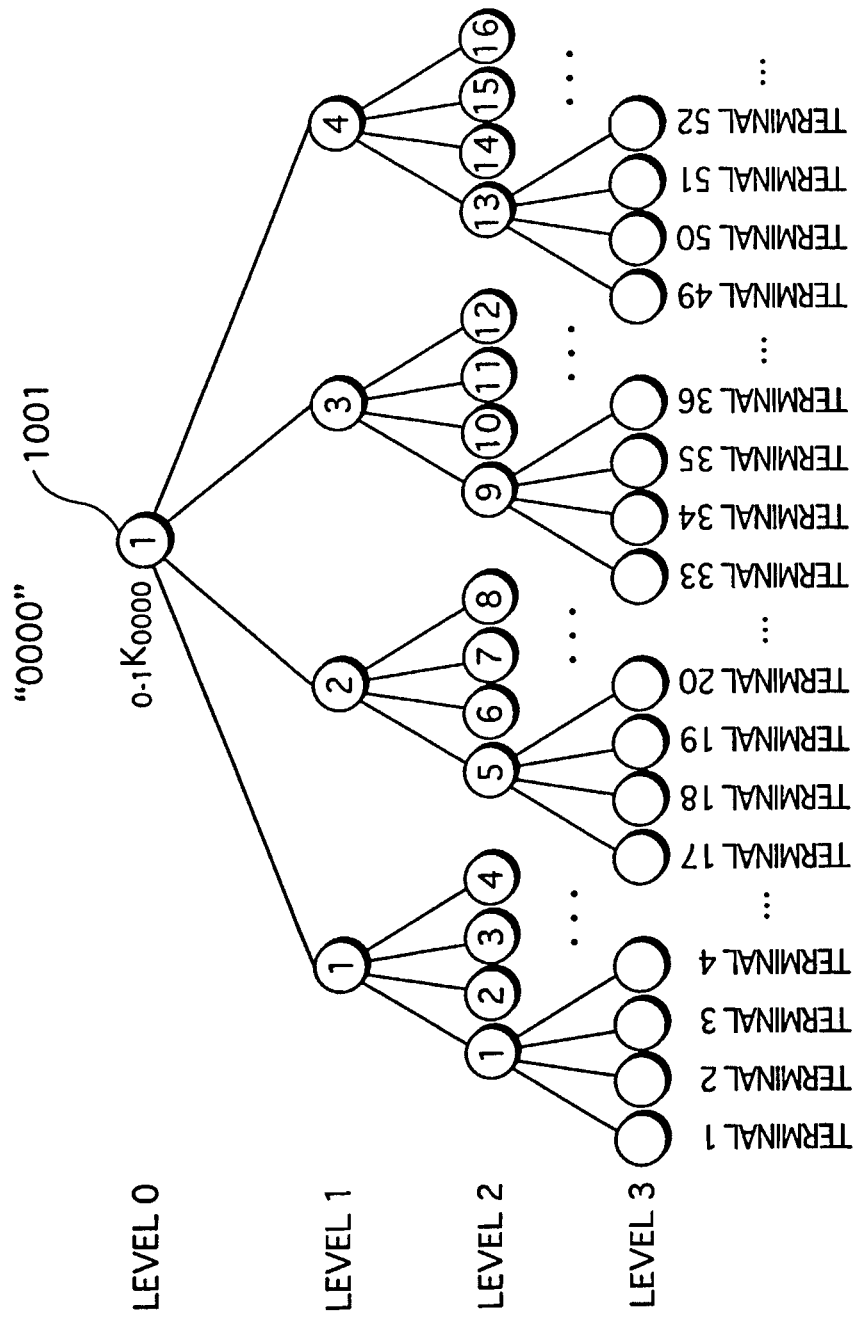
FIG. 14 shows encryption keys and the like in a state in which there are no invalid terminals, in a case where there are only 64 decryption devices.

FIG. 14 shows encryption keys and so on in a state in which there are no invalid terminals, supposing that there are only 64 decryption devices. In this case, the encryption key that is stored in the encryption key group storage unit 203 of the encryption device and that is used in encrypting the content key in recording content to the optical disk 102 is the encryption key 0-1K000, in other words, the encryption key that corresponds to the decryption key expressed by 0-1K0000.

Figure 15:
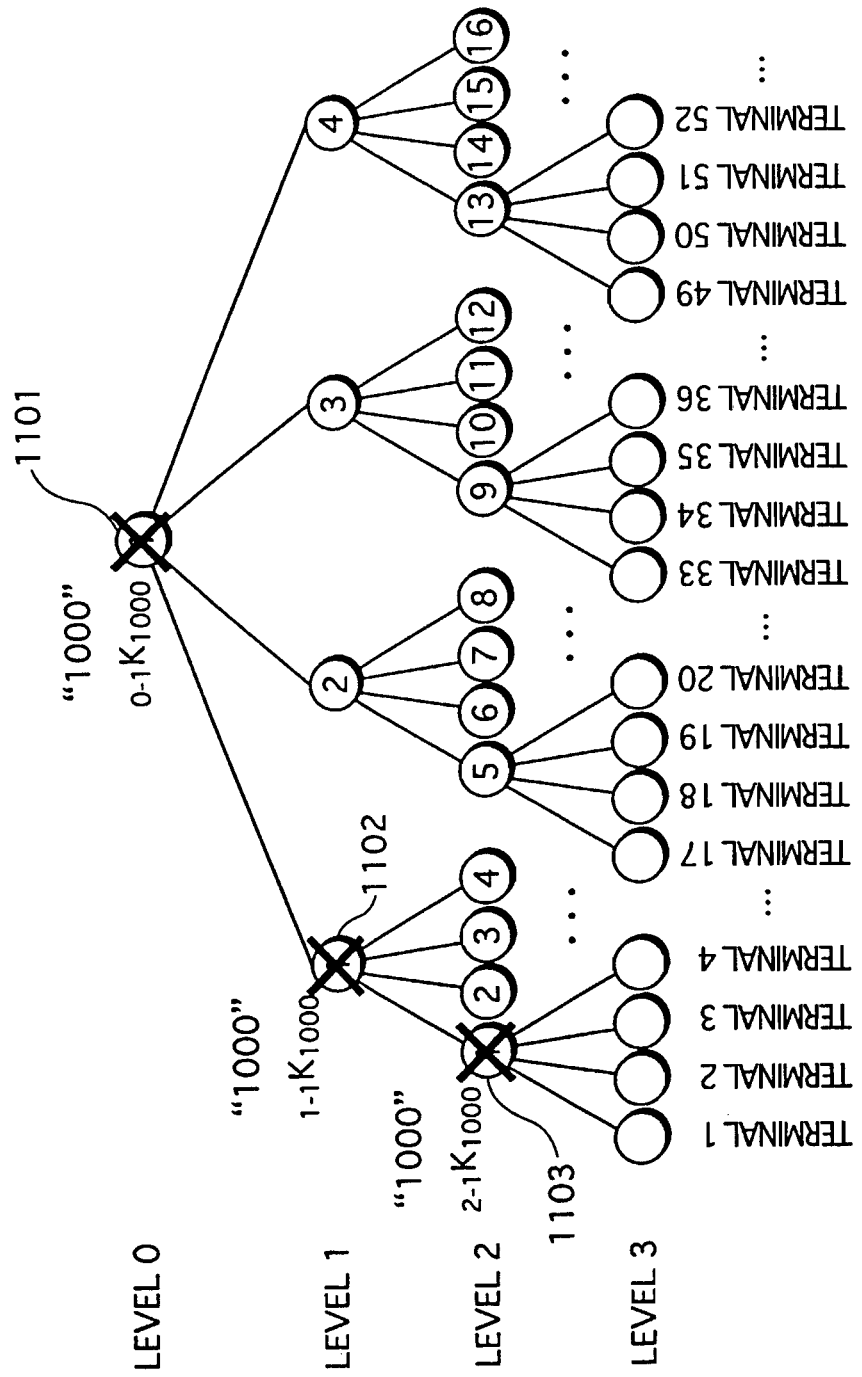
FIG. 15 shows encryption keys and the like in a state in which terminal 1 is an invalid terminal, in a case where there are only 64 decryption devices.

FIG. 15 shows the encryption keys and so on in a state in which the terminal 1 is an invalid terminal, supposing that there are only 64 decryption devices.

When the terminal 1 is the only invalid terminal, as a result of the above-described invalidation information updating processing in the key information stored in the key information storage unit 301, the invalidation information of each node 1103 on level 2 having a relative number 1, the invalidation information of a node 1102 on level 1 having a relative number 1, and the invalidation information of a node 1101 on level 0 having a relative number 1 becomes "1000".

The following describes, supposing the above-described situation, based on the example in FIG. 15, specific content of the key designation processing (see FIG. 13).

First, the encryption key designation unit 306 focuses on the node in the highest level, in other words, the root 1101 (step S31). Then, the encryption key designation unit 306 refers to the key information stored in the key information storage unit 301. Since the invalidation information "1000" of the node 1101 matches one of the above-described eleven invalidation patterns (step S32), the encryption key designation unit 306 designates the encryption key 0-1K1000 corresponding to the matching invalidation pattern as the encryption key to be set in the encryption device 101 (step S33). Since the level one below the level of the focus node is not the lowest level (step S34), the encryption key designation unit 306 sets the node 1102, which is an invalid node among the child nodes of the focus node, as a scheduled focus node (step S35).

After step S35, since the node 1102 exists as a scheduled focus node that has not yet been focused on (step S39), the encryption key designation unit 306 newly prescribes the node 1102 as the focus node (step S40), and returns to the judgement processing at step S32.

Next, the encryption key designation unit 306 refers to the key information stored in the key information storage unit 301 for the focus node. Since the invalidation information "1000" for the node 1102 matches one of the above-described eleven invalidation patterns (step S32), the encryption key designation unit 306 designates the encryption key 1-1K1000 corresponding to the matching invalidation pattern as the encryption key to be set in the encryption device 101 (step S33). Since the level one below the focus node is level 2 and is not the lowest level (step S34), the encryption key designation unit 306 sets the node 1103, which is an invalid node among the child nodes of the focus node, as a scheduled focus node (step S35).

After step S35, since the node 1103 exists as a scheduled focus node that has not yet been focused on (step S39), the encryption key designation unit 306 newly sets the node 1103 as the focus node (step S40), and returns to the judgement processing at step S32.

Next, the encryption key designation unit 306 refers to the key information stored in the key information storage unit 301 for the focus node. Since the key information "1000" for the node 1103 matches one of the above-described eleven invalidation patterns (step S32), the encryption key designation unit 306 designates the encryption key 2-1K1000 corresponding to the matching invalidation pattern as the encryption key to be set in the encryption device 101 (step S33). Since the level 3 one below the level of the focus node is the lowest level (step S34), the encryption key designation unit 306 skips step S35, and since there are no longer any scheduled focus nodes that have not been focused on (step S39), ends the key designation processing.

The result of the key designation processing is that the encryption key group, which is the encryption key group stored in the encryption key group storage unit 203 and which is used to encrypt the content key in recording content on the optical disk 102, is encryption keys 0-1K1000, 1-1K1000, and 2-1K1000.

Note that the encryption key designation unit 306 generates key designation information corresponding to each of the encryption keys designated in the above-described key designation processing, from the node ID, invalidation pattern, and so on in the key information 500 (see FIG. 9), and outputs the generated key designation information. This key designation information is stored in the encryption key group storage unit 203 of the encryption device 101, and is recorded on the optical disk 102 with content and so on by the encryption device 101.

Figure 16:
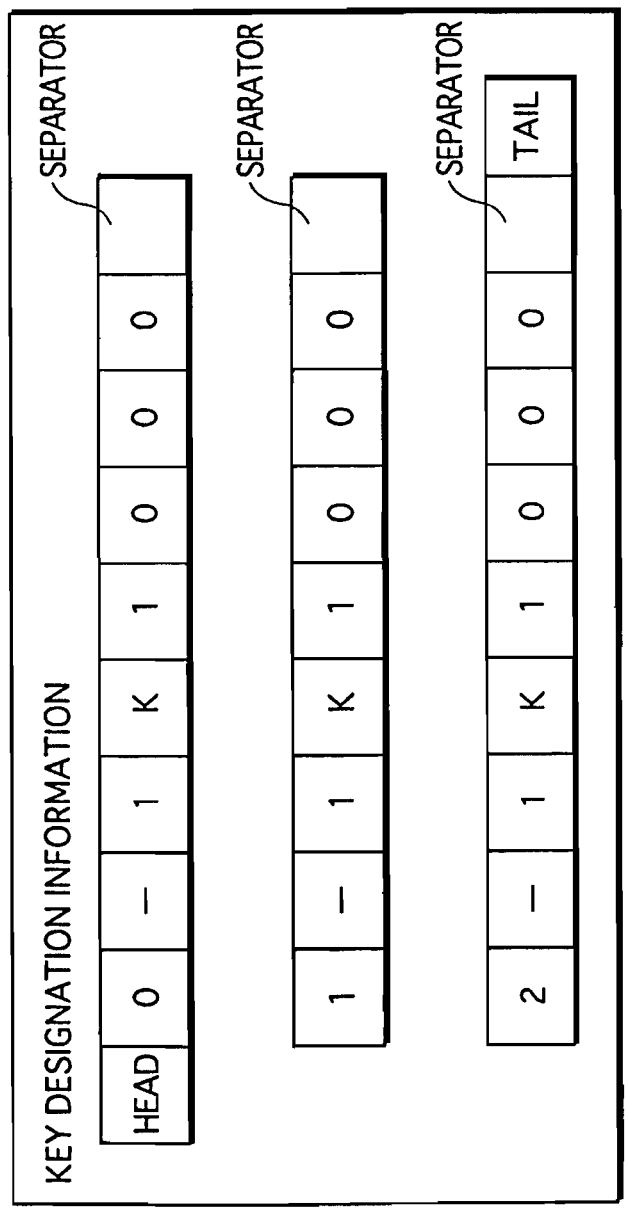
FIG. 16 shows one example of key designation information corresponding to the encryption keys shown in FIG. 15.

FIG. 16 shows an example of key designation information that corresponds to the encryption keys shown in FIG. 15.

In the example in FIG. 16, the key designation information has a structure that combines a character string that is the node ID in the key information 500, the letter K, and the character string of the invalidation pattern.

Note that the output unit 206 in the encryption device 101 records the key designation information shown in FIG. 16 on an optical disk in such a manner that the encrypted content that is generated by encrypting using the encryption key 0-1K1000, the encrypted content that is generated by encrypting the content by using the encryption key 1-1K1000, and the encrypted content that is generated by encrypting the content by using the encryption key 2-1K1000 can be distinguished in the stated order.

<Decryption of Encrypted Content>

The following describes in detail the procedure for one decryption device 103n for decrypting and reproducing content from the optical disk 102. Here, encrypted content keys that are generated by encrypting by the keys by using the encryption keys shown in FIG. 15, and the key designation information shown in FIG. 16 are recorded on the optical disk. Note that the decryption device 103n has the same structure as the encryption device 103a, and only the content of the decryption key group storage unit 212 differs. Here, the various units of the decryption device 103n are described with use of the reference numbers in FIG. 2.

The decryption key selection unit 213 in the decryption device 103n reads the key designation information from the optical disk 102 via the obtaining unit 211, by referring to information showing the correspondence between the decryption keys held in the decryption key group storage unit 212, for example, the node ID and invalidation pattern corresponding to the decryption keys in the key designation information, and the key designation information. The decryption key selection unit 213 selects the encryption key designated in the key designation information and the decryption key that corresponds to the invalidation pattern for the node, in other words, selects the decryption key corresponding to the encryption key. The decryption key selection unit 213 extracts the selected decryption key from the decryption key group storage unit 212, and gives the extracted decryption key to the key decryption unit 214. Upon receiving the decryption key, the key decryption unit 214 decrypts the encrypted content key, which has been obtained through the obtaining unit 211, by using the decryption key. According to this procedure, for example, if the decryption key 0-1K1000 is included in the decryption key group storage unit 212 in the decryption device 103n, the decryption device 103n uses the decryption key 0-1K000 to decrypt the encrypted content key that has been encrypted by using the encryption key 0-1K1000 on the optical disk 102, on which the key designation information shown in FIG. 16 is recorded, to obtain the content key.

After obtaining the content key, the content decryption unit 215 in the decryption device 103n decrypts the encrypted content that has been obtained via the obtaining unit 211, by using the content key, to obtain content, and reproduces the obtained content in the reproduction unit 216.

Note that when the terminal 1 is the decryption device 103a, the decryption device 103a holds only the 22 keys shown in FIG. 11, and does not hold the decryption keys 0-1K1000, 1-1K1000, and 2-1K1000. Therefore, the decryption device 103a cannot correctly decrypt the encryption content keys recorded on the optical disk 102 that are generated by encryption through the use of the encryption keys shown in FIG. 15. Consequently, the decryption device 103a cannot correctly decrypt the encrypted content recorded on the optical disk 102, and cannot reproduce the content.

<Remarks>

When the number of decryption devices in the data protection system 100 is approximately one billion ($\square 4^{15}$), it is necessary to have a 4-ary tree consisting of levels 0 to 15.

In this case, supposing one decryption device is an invalid terminal, in the key designation processing by the encryption key designation unit 306, an encryption key corresponding to one invalidation pattern for each of the fifteen nodes on the path from the root to the leaf that corresponds to the invalid terminal (excluding that leaf) is designated. As a result, 15 encryption keys are used for encrypting the content key in the encryption device 101. At this time, the encrypted content and the 15 encrypted content keys, as well as the key designation information are recorded on the optical disk 102.

Furthermore, if, for example approximately, sixteen thousand ($\square 4^7$) of the one billion decryption devices are invalid terminals, approximately 131,072 ($4^7*(15-7)$) encryption keys are used to encrypt the content key in the encryption device 101. In this case, approximately 131,072 encrypted content keys, and key designation information are recorded on the optical disk 102.

Supposing that each encrypted content key is 64 bits, in other words 8 bytes, the 131,072 encrypted content keys total approximately 1 MB. Therefore, the total amount of data of the encrypted content keys is sufficiently small in relation to the capacity of an ordinary optical disk.

The following discusses the overall data amount of encrypted content keys in cases when encryption is performed in a manner other than that of the present embodiment.

(1) If the encryption content key is 8 bytes, and supposing that there are approximately 1 billion decryption devices of which approximately 16,000 are invalid terminals, and supposing that each of the decryption devices has one decryption key that is different from all other decryption devices, and a method is used in which the content key is encrypted by using each encryption key that corresponds to each decryption key held by each decryption device other than the invalid terminals, the total number of encryption keys to be recorded on the optical disk is approximately 999,984,000. This means that the total amount of encrypted content would be approximately 7600 MB. This large amount of data is not practical.

(2) Supposing the same as above, but consider the case where only one decryption key is assigned to each node in the 4-ary tree that corresponds to each decryption device and leaf, each decryption device has the decryption key assigned to each node reached in an upwards direction from the leaf that corresponds to the decryption device, and a method is employed in which content is encrypted by using each encryption key assigned to all valid child nodes that are child nodes of all the nodes (in other words invalid nodes) that are reached in an upwards direction from leaves that correspond to invalid terminals. Here, the lowest level in the tree structure is level 15, the total number of encrypted content keys to be recorded on the optical disk is approximately 393,216 ($47_7*(15-7)*3$), and the total amount of encrypted content is approximately 3 MB. This amount of data is considerably larger than the amount of data in the data protection system 100 of the present embodiment.

(3) Supposing the same as above, but consider a case where only one decryption key is assigned to each node in a binary tree in which each decryption device is corresponded with a leaf, each decryption device has the decryption key assigned to each node reached in an upwards direction from the leaf that corresponds to the decryption device, and a method is employed in which content is encrypted by using each encryption key assigned to all valid child nodes that are child nodes of all the nodes (in other words invalid nodes) that are reached in an upwards direction from leaves that correspond to invalid terminals. Here, the lowest level in the tree-structure is level 30, the total number of encrypted content of keys to the recorded on the optical disk is 262,144 ($2^{14}*(30-14)$), the total amount of data of the encrypted content is 2 MB. This amount of data is considerably larger than the amount of data in the data protection system 100 of the present embodiment.

Second Embodiment

The following describes a data protection system (hereinafter "second data protection system") of the second embodiment of the present invention with reference to the drawings.

The difference between the data protection system 100 and the second data protection system is that the second data protection system uses a plurality of tree structures for determining decryption keys and encryption keys.

The second data protection system basically has the same constituent features as the data protection system 100 in the first embodiment (see FIGS. 1 to 3). Therefore, the reference numerals used in FIGS. 1 to 3 are used in describing the constituent features of the second data protection system. Here, the description focuses on the features of the second data protection system that are different from the data protection system 100, and omits the similarities.

The specific operation content of a key information generation unit 302, a key information updating unit 304, a decryption key determining unit 305 and an encryption key designation unit 306 of the second data protection system differ from the respective corresponding units in the data protection system 100. However, however the basic processing content of each unit (procedures and so on shown in FIGS. 10, 12, and 13) is almost the same. In the key information storage unit 301 in the second data protection system, the eleven invalidation patterns decryption keys and encryption keys shown in FIG. 9 are stored in correspondence with each node other than those on the lowest level, and one set of a decryption key and an encryption key is stored in correspondence with each node on the lowest level.

Figure 17:
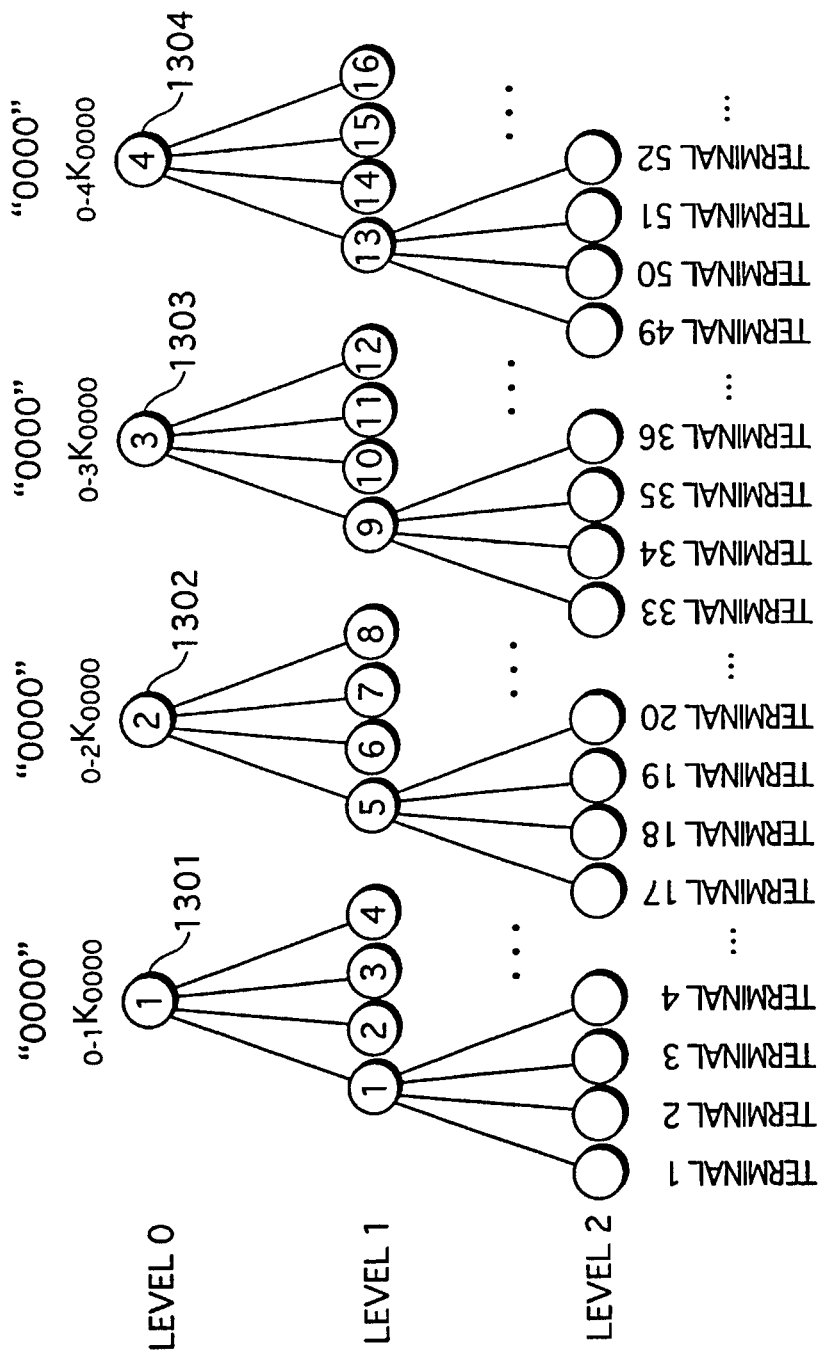
FIG. 17 shows an example of four 4-ary tree structures when there are 64 decryption devices in a second data protection system according to a second embodiment of the present invention.

In the key setting system 104 in the second data protection system, the key information generation unit 302 makes four 4-ary trees, such as those shown in FIG. 17. Each of the leaves in each of the 4-ary trees is made to correspond to one of the decryption terminals 103a to 103n. Consequently, there are four roots 1301 to 1304, and each decryption device corresponds to a leaf in one of the tree structures.

FIG. 17 shows an example of four 4-ary trees when there are 64 decryption devices in the second data protection system of the second embodiment.

In this case, since the four 4-ary trees are structured so that there are 64 leaves, the lowest level in each tree is level 2.

For example, a decryption key group that is held by the terminal 1 shown in FIG. 17 and that as been assigned according to key assigning processing (see FIG. 10) consists of fifteen decryption keys. Specifically, the fifteen decryption keys are 2-1K, 1-1K0000, 1-1K000, 1-1K0010, 1-1K0011, 1-1K0100, 1-1K0101, 1-1K0110, 0-1K0000, 0-1K0001, 0-1K0010, 0-1K0011, 0-1K0100, 0-1K0101 and 0-1K0110. The decryption key 2-1K is the decryption key assigned to the leaf on level 2 having the relative number 1. The other fourteen decryption keys correspond to seven invalidation patterns "0000", "0001", "0010", "0011", "0100", "0101", and "0110" that show that the first child node is not invalid. Specifically, the seven decryption keys 1-1K0000, 1-1K000, 1-1K0010, 1-1K0011, 1-1K0100, 1-1K0101, and 1-1K0110 are from among the decryption keys assigned to the node on level 1 having the relative number 1. The decryption keys 0-1K0000, 0-1K0001, 0-1K0010, 0-1K0011, 0-1K0100, 0-1K0101 and 0-1K0110 are from among the decryption keys assigned to the node on level 1 having the relative number 1.

Furthermore, for example, the fifteen decryption keys assigned to the terminal 17 shown in FIG. 17 are 2-17K, 1-5K0000, 1-5K0001, 1-5K0010, 1-5K0011, 1-5K0100, 1-5K0101, 1-5K0110, 0-2K0000, 0-2K0001, 0-2K0010, 0-2K0011, 0-2K0100, 0-2K0101 and 0-2K0110. The decryption key 2-17K is the decryption key assigned to the leaf on level 2 having the relative number 17. The other fourteen decryption keys correspond to seven invalidation patterns "0000", "0001", "0010", "0011", "0100", "0101", and "0110" that show that the first child node is not invalid. Specifically, the seven decryption keys 1-5K000, 1-5K0001, 1-5K0010, 1-5K0011, 1-5K0100, 1-5K0101, and 1-5K0110 are from among the decryption keys assigned to the node on level 1 having the relative number 5. The seven decryption keys 0-2K000, 0-2K0001, 0-2K0010, 0-2K0011, 0-2K0100, 0-2K0101 and 0-2K0110 are from among the decryption keys assigned to the node on level 0 having the relative number 2.

Furthermore, as shown in FIG. 17, encryption keys 0-1K0000, 0-2K0000, 0-3K0000, and 0-4K0000 are four encryption keys that are designated (see FIG. 13) by the encryption key designation unit 306 in the second data protection system when there are no invalid terminals, and that are set in the encryption device 101 and used in encrypting the content key when recording are four.

Figure 18:
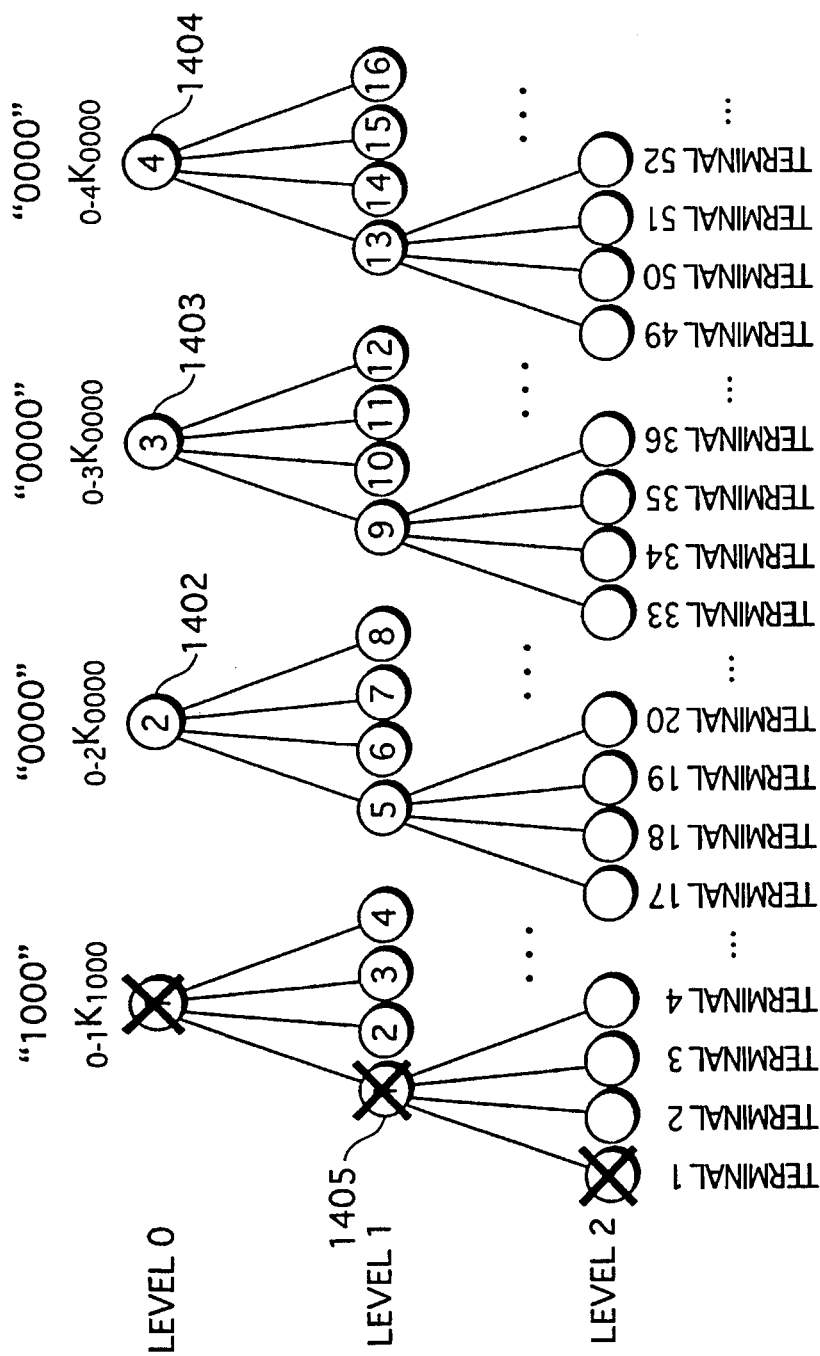
FIG. 18 shows encryption keys and the like in a state in which terminal 1 is an invalid terminal in the second data protection system.

FIG. 18 shows the encryption keys and so on when the terminal 1 is an invalid terminal, in the second data protection system.

When the terminal 1 is the only invalid terminal, as a result of the invalidation information updating processing (see FIG. 12), the key information stored in the key information storage unit 301 is "1000" for the invalidation information of the node 1405 on level 1 having the relative number 1 and "1000" for the invalidation information of the node 1401 on level 0 having the relative number 1, and the encryption keys designated by key designation processing by the encryption key designation unit 306 as the encryption keys to be set in the encryption device 101 are five encryption keys 0-1K1000, 1-1K1000, 0-2K0000, 0-3K0000, and 0-4K0000.

Note that the operations of the encryption device 101 and the decryption devices 103a to 103n in the second data protection system are the same as those in the data protection system 100 in the first embodiment.

Third Embodiment

The following describes a data protection system (hereinafter "third data protection system") of a third embodiment of the present invention with reference to the drawings.

The third data protection system is characterized in that it uses invalidation patterns whose contents differ from the invalidation patterns shown in the first and second embodiments. In other respects, the third data protection system is basically the same as the data protection system 100.

The third data protection system has basically the same constituent features as the data protection system 100 in the first embodiment (see FIGS. 1 to 3). Therefore, the reference numerals used in FIGS. 1 to 3 are used in describing the constituent features of the third data protection system. Here, the description focuses on the features of the third data protection system that are different to the data protection system 100, and omits the similarities.

The key information storage unit 301 in the third data protection system stores an invalidation pattern and five sets of decryption keys and encryption keys in correspondence with each node in the levels other than the lowest level, and one set of a decryption key and an encryption key in correspondence with each node in the lowest level.

In the first and second embodiments "invalidation pattern" denotes a value, among the possible values "0000", "1000" etc. of the invalidation information of a node, in which the number of "ones" is less than (n−1) when the tree structure is an n-ary tree. However, in the third embodiment, "invalidation pattern" denotes the values from among the possible invalidation information values in which the number of "ones" is less than two.

Consequently, there are five types of invalidation patterns: "0000", "0001", "0010", "0100", and "1000". Five groups of an encryption key and a decryption key for each of the invalidation patterns are corresponded with each node other than the leaves by the key information generation unit 302. Key information that consists of one group of an encryption key and decryption key in correspondence with each leaf is generated in correspondence with each leaf, and is stored in the key information storage unit 301.

Figure 19:
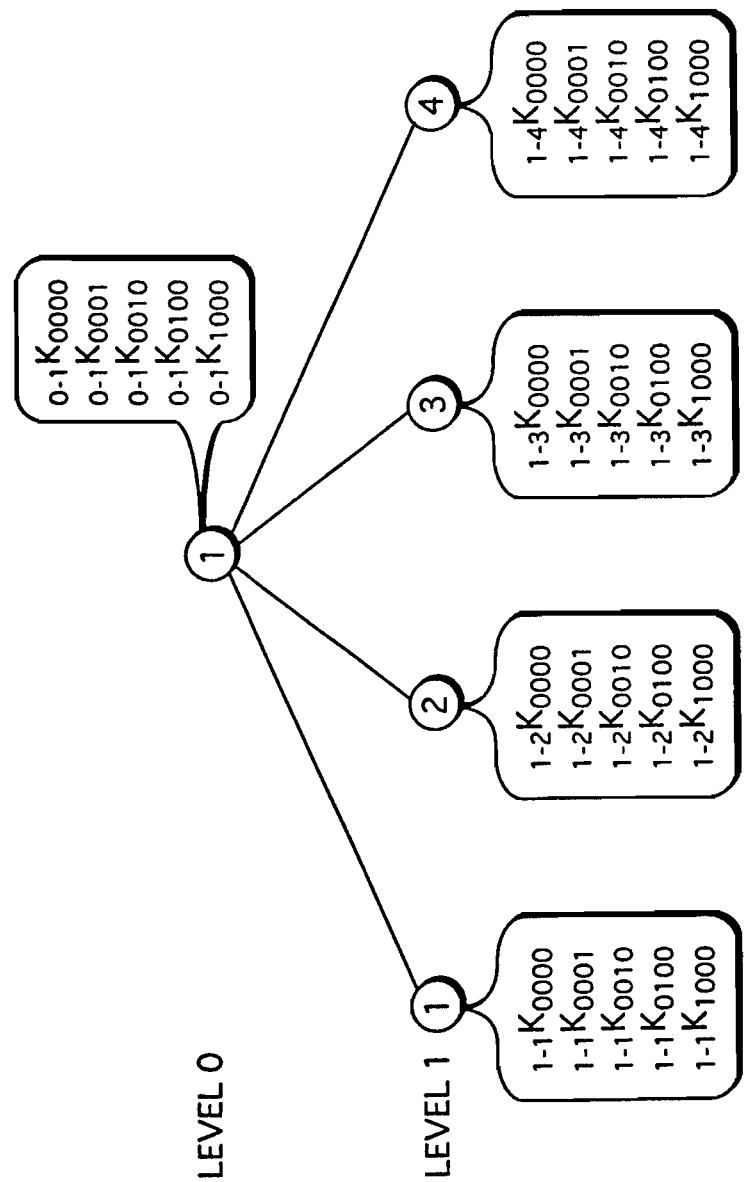
FIG. 19 shows decryption keys assigned to each node in a 4-ary tree structure used in a third embodiment of the present invention.

FIG. 19 shows decryption information that is assigned to each node in the 4-ary tree used in the third embodiment.

As shown in FIG. 19, for example, five decryption keys 0-1K0000, 0-1K0001, 0-1K0010, 0-1K0100, and 0-1K1000 are assigned to the root, and five decryption keys 1-1K0000, 1-1K0001, 1-1K0010, 1-1K0100, and 1-1K1000 are assigned to the node on level 1 having a relative number 1 on level 1.

The following describes operations of the third data protection system when there are only 64 decryption devices, for example.

Figure 20:
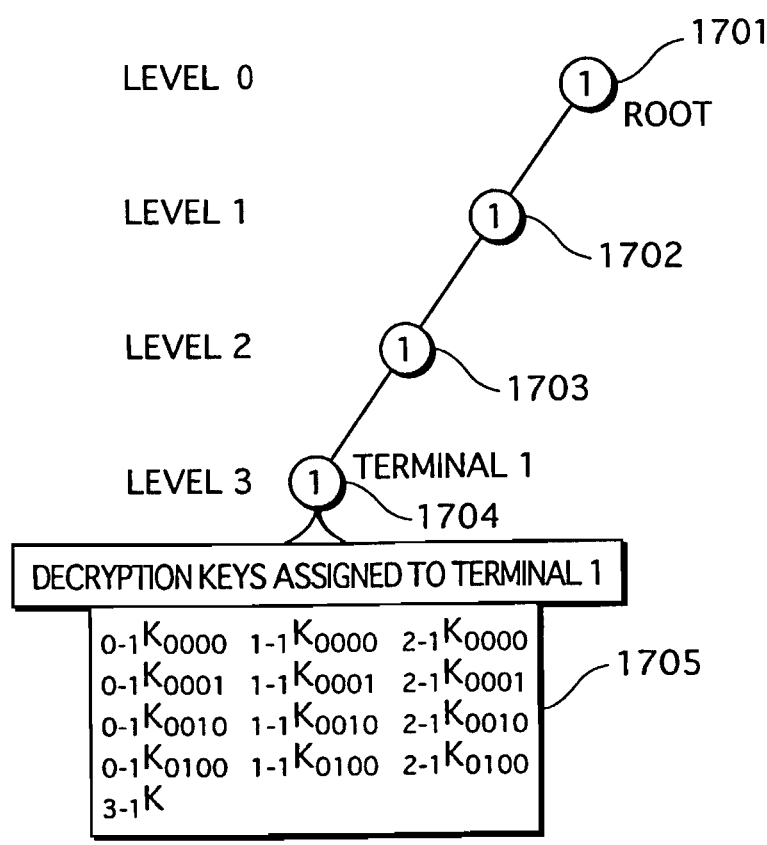
FIG. 20 shows a decryption key group 1705 assigned to a decryption terminal (terminal 1) that corresponds to a leaf in a level 3 having a relative number 1, supposing that there are only 64 decryption devices.

FIG. 20 shows a decryption key group 1705 that is assigned to a decryption terminal (terminal 1) corresponding to a leaf on level 3 having a relative number 1, supposing that there are only 64 decryption devices.

The decryption key group 1705 shown in FIG. 20 that is held in the terminal 1 and assigned according to the key assignment processing of the decryption key determining unit 305 (see FIG. 10) in the third data protection system, consists of thirteen decryption keys. Specifically, the thirteen decryption keys are 3-1K, 2-1K0000, 2-1K0001, 2-1K0010, 2-1K0100, 1-K0000, 1-1K0001, 1-1K0010, 1-1K0100, 0-1K0000, 0-1K0001, 0-1K0010 and 0-1K0100. The decryption key 3-1K is the decryption key assigned to the leaf 1704 on level 3 having the relative number 1. The other twelve decryption keys correspond to four invalidation patterns "0000", "0001", "0010", and "0100" which indicate that the first child node in not invalid. Specifically, the decryption keys 2-1K0000, 2-1K0001, 2-1K0010 and 2-1K0100 are from among the decryption keys assigned to the node 1703 on level 2 having a relative number 1 and being the parent node of the leaf 1704. The decryption keys 1-1K0000, 1-1K0001, 1-1K0010 and 1-1K0100 are from among the decryption keys assigned to the node 1702 on level 1 having a relative number 1 and that is the parent node of the node 1703. The decryption keys 0-1K0000, 0-1K0001, 0-1K0010 and 0-1K0100 are from among the decryption keys assigned to the node 1701 on level 0 having a relative number 1 and that is the parent node of the node 1702. Consequently, the number of decryption keys held by each terminal in the third data protection system is less that that in the data protection system 100 in the first embodiment.

Note that the decryption key group assigned to each terminal by the decryption key determining unit 305 is stored in the decryption key group storage unit 212 of each terminal in the manufacturing process or the like.

The following describes the encryption key that is necessary in recording content and the like to the optical disk 102, when the third data protection system is actually put into operation.

When there are only 64 decryption devices and there are no invalid terminals, the encryption key 0-1K0000 is the encryption key that is designated according to the key designation processing of the encryption key designation unit 306 in the third data protection system, stored in the encryption key group storage 203 of the encryption device 101, and used in encrypting the content key in recording content to the optical disk 102, in other words, one encryption key that corresponds to the decryption key 0-1K0000.

Figure 21:
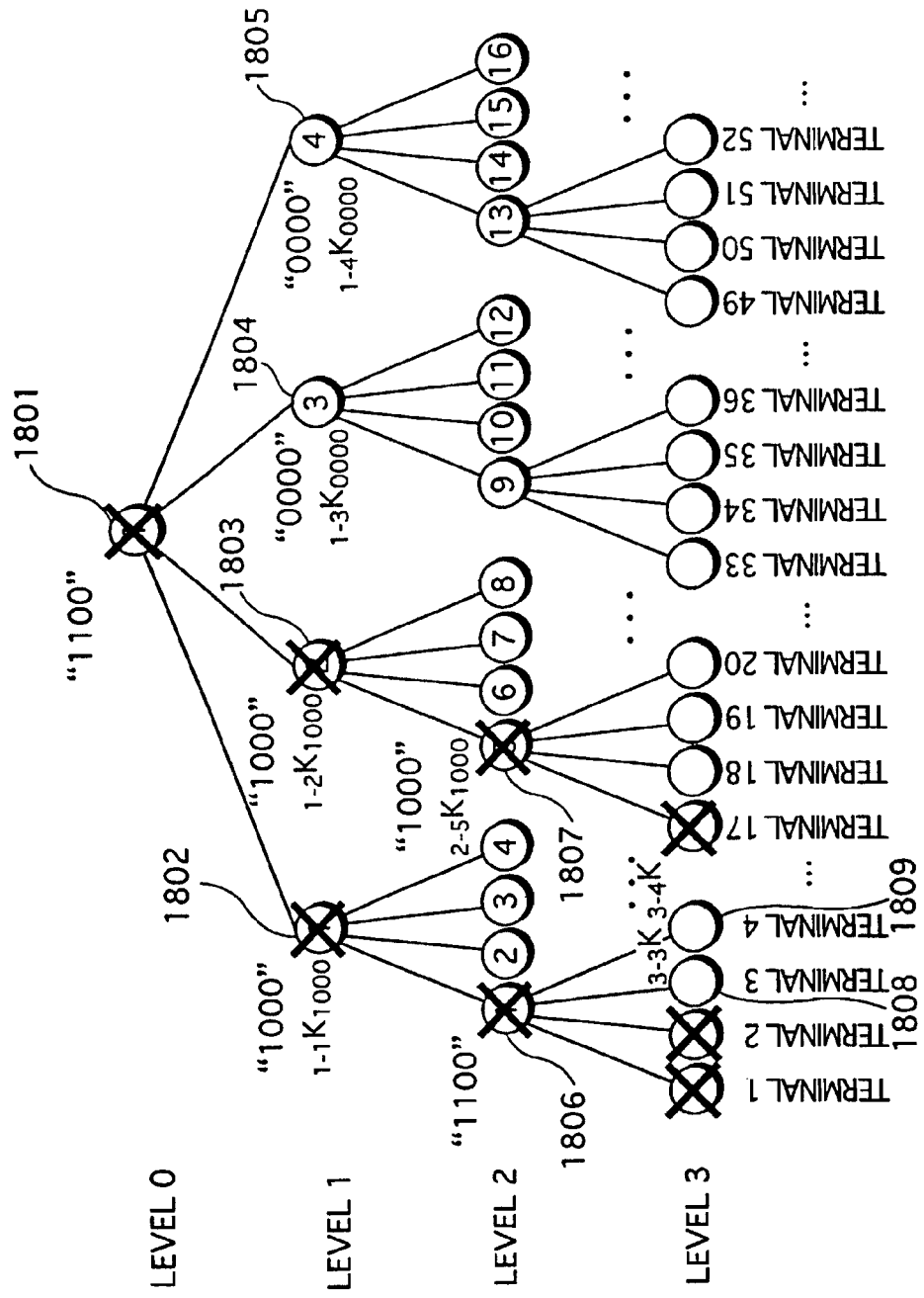
FIG. 21 shows encryption keys and the like in a state in which terminals 1, 2, and 17 are invalid terminals, supposing that there are only 64 decryption devices.

FIG. 21 shows encryption keys and so on when terminals 1, 2, and 17 are invalid terminals, supposing there are only 64 decryption devices.

The key information in the key information storage unit 301 is updated according to the invalidation information updating processing (see FIG. 12) of the key information updating unit 304 in the third data protection system. Note that the invalidation information updating processing is identical to the content performed by the key information updating unit 304 of the data protection system 100 of the first embodiment. As a result, in the key information stored in the key information storage unit 301, the invalidation information of the leaves on level 3 having relative numbers 1, 2, and 17 is "1111", the invalidation information of the node 1806 on level 2 having a relative number 1 is "1100", the invalidation information of the node 1807 on level 2 having a relative number 5 is "1000", the invalidation information of the node 1802 on level 1 having a relative number 1 is "1000", the invalidation information of the node 1803 on level 1 having a relative number 2 is "1000", the invalidation information of the node 1801 on level 0 having a relative number 1 is "1100", and the invalidation information of other nodes is "0000". Note that nodes whose corresponding invalidation information is "0000" are valid nodes, and the other nodes are invalid nodes.

After the invalidation information updating processing, the encryption key designation unit 306 designates the encryption key according to the key designation processing (see FIG. 13).

The following describes a specific example of the processing content of the key designation processing based on the example showed in FIG. 21, with use of FIG. 13.

In this example, the lowest level is level 3.

First, the encryption key designation unit 306 focuses on a node on the highest level, in other words the root 1801 (step S31). Next, the encryption key designation unit 306 refers to the key information stored in the key information storage unit 301 for the focus node to judge whether or not the invalidation information "1100" of the node 1801 matches any of the aforementioned five types of invalidation patterns (step S32). Since the invalidation information of the node 1801 does not match any of the invalidation patterns, the encryption key designation unit 306 then judges whether or not the level one below the node 1801 that is being focused on is the lowest level (step S36). Since the level one level below the node 1801 is not the lowest level, the encryption key designation unit 306 prescribes all the child nodes of the node 1801 as scheduled focus nodes (step S38).

According to step S38, nodes 1802 to 1805 become scheduled focus nodes.

Next, the encryption key designation unit 306 judges whether or not there are any scheduled focus nodes that have not yet been focused on (step S39), and since there are, focuses on the node 1802 which is one of those (step S40). Then, the encryption key designation unit 306 returns to the judgement processing at step S32, and refers to the key information to judge whether or not the invalidation information "1000" of the node 1802 that is being focused on matches any of the aforementioned five types of invalidation patterns (step S32). Since the invalidation information "1000" does match one of the invalidation patterns, the encryption key designation unit 306 designates the encryption key 1-1K1000 that corresponds to the invalidation pattern "1000" as the encryption key to be set in the encryption device 101 (step S33). Then, since level 2, which is one level below level 1 that is being focused on, is not the lowest level (step S34), the encryption key designation unit 306 prescribes the node 1806, which is an invalid node from among the child nodes of the node 1802, as a scheduled focus node (step S35).

After step S35, the encryption key designation unit 306 judges whether or not there are any scheduled focus nodes that have not yet been focused on (step S39), and since there are, focuses on the node 1806 which is one of those (step S40). Next, the encryption key designation unit 306 returns to the judgement processing at step S32.

Next, the encryption key designation unit 306 refers to the key information to judge whether or not the invalidation information "1100" of the node 1806 matches any of the aforementioned five types of invalidation patterns (step S32), and since it does not, then judges whether or not the level one below the node 1806 that is being focused on is the lowest level (step S36). Since level 3, which is the level that is one level below the node 1806, is the lowest level, the encryption key designation unit 306 designates encryption keys 3-3K and 3-4K that correspond to the leaves 1808 and 1809 respectively, which are the valid nodes among the child nodes of the node 1806, as encryption keys to be set in the encryption device 101 (step S37). Then, the encryption key designation unit 306 judges whether or not there are any scheduled focus nodes that have not yet been focused on (step S39), and since there are, focuses on the node 1803 which is one of those, (step S40), and returns to the judgement processing at step S32.

Next, the encryption key designation unit 306 refers to the key information to judge whether or not the invalidation information "1000" of the node 1803 matches any of the aforementioned five invalidation patterns (step S32), and since it matches one of the invalidation patterns, designates the encryption key 1-2K1000 that corresponds to the invalidation pattern "1000" as the encryption key to be set in the encryption device 101 (step S33). Then, since level 2, which is the level one below the node 1803 that is being focused on, is not the lowest level (step S34), the encryption key designation unit 306 prescribes the node 1807, which is an invalid node among the child nodes of the node 1803, as a scheduled focus node (step S35).

Next, the encryption key designation unit 306 judges whether or not there are any scheduled focus nodes that have not been focused on yet (step S39), and since there are, focuses on the node 1807 that is one of those (step S40). Then, the encryption key designation unit 306 returns to the judgement processing at step S32, and refers to the invalidation information "1000" of the node 1807 that is being focused on to judge whether or not the invalidation information "1000" matches any of the aforementioned five invalidation patterns (step S32). Since the invalidation information "1000" of the node 1807 matches one of the invalidation patterns, the encryption key designation unit 306 designates the encryption key 2-5K1000 that corresponds to the invalidation pattern "1000" as an encryption key to be set in the encryption device 101 (step S33). Since level 3, which is the level one level below the node 1807 that is being focused on, is the lowest level (step S34), the encryption key designation unit 306 skips the processing at step S35, and judges whether or not there are any scheduled focus nodes that have not yet been focused on (step S39), and since there are, focuses on the node 1804 which is one of those (step S32), and returns to the judgement processing at step S32.

Next, the encryption key designation unit 306 refers to the key information to judge whether or not the invalidation information "0000" of the node 1804 matches any of the aforementioned five types of invalidation patterns (step S32), and designates the encryption key 1-3K0000 that corresponds to the invalidation pattern "0000" as an encryption key to be used in the encryption device 101 (step S33). Then, since level 2, which is the level below the node 1804 that is being focused on, is not the lowest level (since S34), the encryption key designation unit 306 tries to prescribe an invalid node among the child nodes of the node 1804 as a scheduled focus node (step S35). However, since all the child nodes of the node 1804 are valid nodes, no new scheduled focus nodes are prescribed.

Next, the encryption key designation unit 306 judges whether or not there are any scheduled focus nodes that have not yet been focused on (step S39), focuses on the node 1805 that is one of those (step S40), and returns to the judgement processing at step S32. Then, the encryption key designation unit 306 refers to the key information to judge whether or not the invalidation information "0000" of the node 1805 matches any of the aforementioned five invalidation patterns (step S32), and since it matches one of the invalidation patterns, designates the encryption key 1-4K0000 that corresponds to the invalidation pattern "0000" of the node 1805 as the encryption key to be set in the encryption device 101 (step S33). Since level 2, which is one level below the node 1805 that is being focused on, is not the lowest level (step S34), the encryption key designation unit 306 tries to prescribe an invalid node among the child nodes of the node 1805 as a scheduled focus node (step S35). However, since all the child nodes of the node 1805 are valid nodes, no new scheduled focus nodes are prescribed.

Next, the encryption key designation unit 306 judges whether or not there are any scheduled focus nodes that have not yet been focused on (step S39), and since there are no longer any, ends the key designation processing.

As a result of such key designation processing, seven encryption keys 1-1K1000, 1-2K1000, 1-3K0000, 1-4K0000, 2-5K1000, 3-3K, and 3-4K are designated to be set in the encryption device 101.

Note that the seven encryption keys are stored later in the encryption key group storage unit 203 in the encryption device 101, and are used in encryption of the content key by the key encryption unit 204. Furthermore, each encrypted content key that is generated by encryption through use of each encryption key, respectively, is recorded by the output unit 206 on the optical disk 102 together with the key designation information that is used to designate the decryption key that corresponds to each encryption key, and encrypted content.

As a result of the assignment by the decryption key determining unit 305 of decryption keys to each terminal, none of the decryption keys that corresponds to the seven encryption keys is held by any of the terminals 1, 2, and 7. Furthermore, the other terminals are assigned one or more of the decryption keys corresponding to the seven encryption keys.

Consequently, after content has been recorded on the optical disk 102 according to encryption processing using the seven encryption keys, decryption processing of the content cannot be performed normally by using the decryption keys exposed from the terminals 1, 2, and 7. Furthermore, other terminals are able to perform decryption processing of the content normally.

Fourth Embodiment

The following describes a data protection system of a fourth embodiment (hereinafter "fourth data protection system") with reference to the drawings.

In the data protection system 100 shown in the first embodiment, the optical disk 102 on which the encryption device 101 records encrypted content, and which is distributed to the decryption deices 103a to 103n, is a DVD-ROM or the like. However, the fourth data protection system has both a prerecorded recording medium such as a DVD-ROM and a recordable medium such as a DVD-RAM, of which the optical disk 102 is only the recordable medium.

In other words, in contrast to the optical disk 102 that is recordable, certain information is recorded by the system side in the fourth data protection system. The user has the terminal encrypt arbitrary content and then record the encrypted content to the optical disk 102. Then, the user is able to distribute the optical disk 102. In addition, a user of the same terminal or another terminal can use their terminal to decrypt and use the content recorded on the optical disk 102. Note that, here, the description focuses on the features of the fourth data protection system that are different from the data protection system 100, and omits the similarities.

Figure 22:
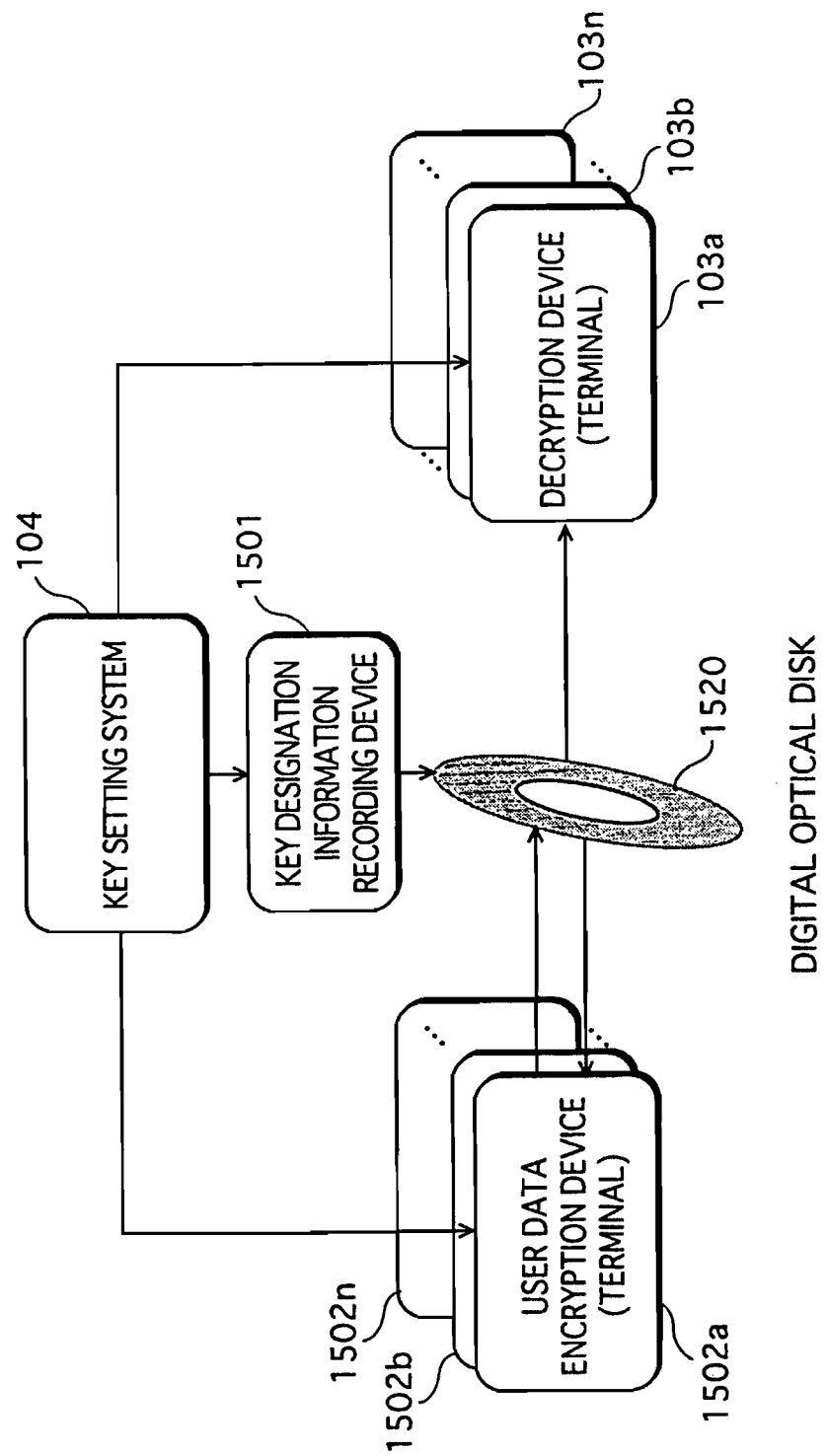
FIG. 22 is an outline of the construction of a fourth data protection system according to a fourth embodiment of the present invention.

FIG. 22 is an outline of the construction of the fourth data protection system of the fourth embodiment of the present invention.

The fourth data protection system, as shown in FIG. 22, is composed of a key designation information recording device 1501, a plurality of user data encryption devices (terminals) 1502a to 1502n, a plurality of decryption devices (terminals)

103a to 103n, and a key setting system 104. It is assumed that, for example, the key setting system 104 and the key designation information recording device 1501 are used by an organization that manages copyright protection, and the terminals are used by general users.

Note that the decryption terminals 103a to 103n are the same as those shown in the first embodiment. Furthermore, all or some of the user data encryption devices 1502a to 1502n may be provided in the same terminal as all or some of the decryption devices 103a to 103n.

Furthermore, the key setting system 104 in the fourth data protection system is basically the same as that in the first embodiment, but there are some additional functions. Specifically, in the key setting system 104 in the fourth data protection system, supposing that a 4-ary tree structure in which each terminal is corresponded in advance with a leaf in the fourth data protection system, decryption keys are assigned to each terminal according to the key assignment processing shown in FIG. 10. It is supposed here that if an assignment target terminal is a decryption terminal then a decryption key group is assigned to the terminal, and if the assignment target terminal is a user data encryption device then an encryption key group that corresponds to the decryption key group is assigned to the terminal. Note that the key setting system 104 generates and then outputs information that shows the correspondence between the keys assigned to a terminal and the leaf in the tree structure.

For convenience, in this fourth embodiment, it is assumed that each of the user data encryption devices 1502a to 1502n is provided in the same terminal as the same respective decryption device 103a to 103n. Furthermore, corresponding encryption keys and decryption keys are assumed to have the same value. Consequently, each terminal holds a key group consisting of encryption keys and decryption keys that has been assigned by the key setting system 104 in advance, and information showing the correspondence between the key group and the node in the 4-ary tree.

Furthermore, the key setting system 104 in the fourth data protection system has an additional function of outputting the key designation information indicating one or more encryption keys that are designated as a result of the invalidation information updating processing (see FIG. 12) and the key designation processing (see FIG. 13) when in operation, to the key designation information recording device 1501. For example, when there are no invalid terminals, the key designation information is only "0-1K0000".

The key designation information recording device 1501, which includes hardware capable of recording data to an optical disk, is a device which has a function of recording key designation information input from the key setting system 104 to the optical disk 102.

Furthermore, each of the user data encryption devices 1502a to 1502n has equivalent functions to those of the encryption devices shown in the first embodiment (see FIG. 2). However, the user can freely store digital contents in the content storage unit 201. In addition, the content of the encryption key group storage unit 203 is the encryption key group obtained from the above-described key setting system 104 and held by the terminal, and information indicating the correspondence between each encryption key and the 4-ary tree. The encryption key used in the encryption of the content key obtained by the key encryption unit 204 from the random number generation unit 202 is selected as a result of an encryption key selection processing described later. Furthermore, the output unit 206 does not record the key designation information to the optical disk 102, but instead records encrypted content and the encrypted content key to the optical disk 102.

Furthermore, each of the user data encryption devices 1502a to 1502n have an additional function of reading the key designation information that has been recorded by the key designation information recording device 1501 from the optical disk 102, and performing encryption key selection processing to select the encryption key for use in encrypting the content key. This encryption key selection processing is processing for verifying the information indicating the correspondence between each encryption key in the encryption key group storage unit 203 and the nodes and the key designation information, and if the same node is shown in both pieces of information, selecting the encryption key that corresponds to that node, and sending the selected encryption key to the key encryption unit 204. The encryption key selection processing is similar to the processing for selecting a decryption in the decryption key selection unit 213 of the decryption device 103a shown in the first embodiment.

Specifically, when encrypting content with the content key and recording the encrypted content to the optical disk 102, each of the user data encryption devices 1502a to 1502n has a function of encrypting the content key by using the encryption key following the key designation information recorded in advance on the optical disk 102, and recording the encrypted content key on the optical disk 102.

Consequently, according to the fourth data protection system, the numerous terminals whose decryption key and so on have not been exposed cannot decrypt with a decryption key that has been exposed from another terminal. The content can be encrypted and recorded on the optical disk 102 so that it can be correctly decrypted in the numerous terminals that have decryption keys that have not been exposed.

<Supplementary Remarks>

The data protection system of the present invention has been described based on the first to fourth embodiments, but the present invention is not limited to these embodiments. Specifically:

(1) The content shown in the first to fourth embodiments is video, audio and the like but is not limited to such content. The content may be a computer program or other data, or a combination of a computer program or other data and video or the like.

(2) The decryption devices shown in the first to fourth embodiments have a reproduction unit 216 for reproducing content, but they may instead have a function of outputting decrypted content to an external device.

(3) In the first to third embodiments, encrypted content is recorded on the optical disks 102 and distributed to the decryption devices. However, besides distribution on a recording medium, it is also possible to transmit content via a wireless or wired transmission path.

When an embodiment in which content is transmitted is employed, it is necessary for the output unit 206 in the encryption device 101 to have hardware that has a communication function, and to transmit encrypted content, the encrypted content key, and the key designation information to each decryption device (terminal). Furthermore, it is necessary for the obtaining unit 211 in the decryption device 103a and other decryption devices to have hardware that has a communication function, and to receive and obtain the encrypted content, the encrypted content key and the key designation information. Note that the transmission method may be, for example, one in which the encryption device 101 records to a recording medium in a server that is connected to, for example, the Internet, and the decryption device 103a and so on receive the content of the recording medium via the Internet or the like.

Furthermore, the recording medium used when an embodiment is employed in which content is transmitted is not limited to being an optical disk, but may be an IC card, a flexible disk, magnetic tape, a ROM, or the like.

(4) The method of determining the invalidation pattern corresponding to each node in the key information shown in the first embodiment is simply one example. For example, it is possible to have nodes other than the root not have an invalidation pattern "0000", but instead have invalidation patterns "0111", "1101", "1011", and "1110". Here, the contents of the key assignment processing (see FIG. 10) and the key designation processing (see FIG. 13) are varied to a degree to fit these patterns.

Furthermore, in the first to fourth embodiments the invalidation patterns are prescribed supposing a 4-ary tree structure. However, it is sufficient for the tree structure to have at least one part that has a structure of at least three branches, in other words one parent node in at least one level having at least three child nodes. The parent node may have three branches or five branches, or parent nodes having differing numbers of branches, for example three or four, may exist in one level.

Furthermore, the number of "ones" in the invalidation patterns of each node in the 4-ary tree is limited to being less than three in the first embodiment, and less than two in the third embodiment. However, the number of "ones" in the invalidation pattern of each node may be limited to less than two, less than three, or less than four for example in a 5-ary tree structure.

(5) It is desirable for the units used in decryption in the decryption devices 103a to 103n shown in the first to the fourth embodiments and the units used in encryption in the user data encryption devices 1502a to 1502n in the fourth embodiment to be constructed according to so-called tamper-resistant techniques so that the system, data and so on used in decryption and encryption are protected.

(6) The key setting system in the embodiments outputs the decryption keys that are determined when determining the decryption keys to be assigned to each terminal and information showing the node in the tree structure to which the decryption key corresponds, the result of which is that the decryption devices 103a to 103n hold a key group and information indicating the node that corresponds to each decryption device. However, the decryption devices do not necessarily have to hold the information indicating the node that corresponds to the decryption devices. Even if the decryption devices do not hold the information indicating the node that corresponds to the decryption devices, the decryption devices can decrypt content by successively trying to decrypt the encrypted content key recorded on the optical disk, by using each decryption key that that decryption device holds. Note that, in this case, a rule may be provided such as the head eight bits of the content key being "0", or a general digital signature may be used, so that the authenticity of a decrypted content key can be verified. Here, the decryption device uses the decrypted content key to decrypt content only when the decrypted content key is authentic.

(7) In the first embodiment, the content key, the decryption keys and the encryption keys are 64 bits, but the data size of the keys is not limited to being 64 bits, and may be another number of bits. Note that, in FIG. 16, the character strings are formed from a character string that is the node ID in the key information 500, the letter K, and the character string of the invalidation pattern, but the key designation information is not limited to this format.

(8) In the first to fourth embodiments, the content key used in encryption of content is encrypted by using encryption keys expressed as 0-1K0000 etc., but besides the content key, various data that must be kept secret may also be encrypted by using these encryption keys.

(9) The invalidation information updating processing, the key assignment processing and the key designation processing (the procedures shown in FIGS. 10, 12, and 13) in the key setting system 104 shown in the first to fourth embodiments may be distributed as a computer program for execution by a computer or a device that has a program execution function, either recorded on a recording medium or via various types of communication paths. Such a recording medium may be an IC card, an optical disk, a flexible disk, a ROM, or the like. The distributed computer program is used by being installed in a computer or the like that then performs invalidation information updating processing, key assignment processing and key designation processing such as that shown in the first to fourth embodiments by executing the computer program.

The data protection system of the present embodiment can be used to protect the copyright of digital works and so on in a system composed of a device for distributing a digital work of audio, video and the like through a recording medium and a plurality of usage devices for reproduction and so on of distributed digital works.

The invention claimed is:

1. A decryption key determining device that determines decryption key groups for use in decryption to be individually assigned to at least three terminals that obtain encrypted data and decrypt the obtained encrypted data, the decryption key determining device comprising:
   a non-transitory storage device storing a program, the program being executable by at least one processor;
   a decryption key setting unit configured for:
   (a) determining two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member,
   (b) determining a correspondence between an individual decryption key and each terminal and each determined terminal group,
   (c) determining the terminal groups so that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member,
   (d) determining the terminal groups so that each terminal group includes three or more terminals as members, and so that a terminal group exists that contains three or more terminal groups, and
   when each terminal is corresponding with a node on a lowest level in an N-ary tree structure having a plurality of hierarchies, where N is a natural number equal to or greater than three,
   (e) determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes, (f) determining an individual decryption key for each determined combination pattern and storing the determined decryption key in correspondence with the parent node, (g) storing an individual decryption key in correspondence with each node in the lowest level, (h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes, and (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined; and a decryption key group assignment unit configured for:

(a) determining, for each terminal, a decryption key group based on the corresponding decryption key and the decryption keys corresponding with each terminal group in which the terminal is included, as a decryption key group to be assigned to the terminal, respectively, (b) determining, for each terminal, the corresponding decryption key and all decryption keys corresponding with all terminal groups that include the terminal, as a decryption key group to be assigned to the terminal, and (c) determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern.

2. The decryption key determining device of claim 1, wherein the key setting unit is operable to determine the plurality of combination patterns for each node, excluding the nodes on the lowest level, in the N-ary tree structure, by prescribing combination patterns so that each combination pattern corresponds to one of all combinations of two or more of the N nodes that are one level below and are reached from the each node constituting a parent node of the two or more of the N nodes; and the decryption key setting unit is operable to store the determined decryption keys in correspondence with the parent node.

3. The decryption key determining device of claim 1, wherein the key setting unit is operable to determine the plurality of combination patterns for each node, excluding the nodes on the lowest level, in the N-ary tree structure by prescribing combination patterns so that each combination pattern corresponds to one of all combinations of all N of the nodes and N−1 of the N nodes that are one level below and are reached from the each node constituting a parent node of the N nodes; and key setting unit is operable to store the determined decryption keys in correspondence with the parent node.

4. A decryption key determining method that determines decryption key groups, for use in decryption, to be individually assigned to at least three terminals that obtain encrypted data and decrypt the obtained encrypted data, the decryption key determining method comprising:

in a decryption key setting unit, the decryption key setting unit including a non-transitory storage device storing a program, the program being executable by a processor:

(a) determining, using the processor, two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member;

(b) determining a correspondence between an individual decryption key and each terminal and each determined terminal group;

(c) determining the terminals groups so that that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member;

(d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three;

(e) determining for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes;

(f) determining an individual decryption key for each determined combination pattern and storing the determined decryption key in correspondence with the parent node;

(g) storing an individual decryption key in correspondence with each node in the lowest level;

(h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes; and (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined; and in a decryption key group assignment unit, the decryption key group assignment unit including a non-transitory storage device storing a program, the program being executable by a processor:

(a) determining, for each terminal, a decryption key group based on the corresponding decryption key and decryption keys corresponding with each terminal group in which the terminal is included, as a decryption key group to be assigned to the terminal, respectively;

(b) determining for each terminal, the corresponding decryption key and all decryption keys corresponding with all terminal groups that include the terminal, as the decryption key group to be assigned to the terminal; and (c) determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern.

5. A non-transitory computer-readable recording medium having stored thereon a computer program causing a computer to execute a decryption key determining processing steps that determines decryption key groups, for use in decryption, to be individually assigned to at least three terminals that obtain encrypted data and decrypt the obtained encrypted data, the decryption key determining processing steps comprising:

(a) determining two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member;

(b) determining a correspondence between an individual decryption key and each terminal and each determined terminal group;

(c) determining the terminals groups so that at least one terminal group exists that completely includes the two or more terminal groups, and so that any one of the terminal groups within the two or more terminal groups that shares a same terminal group as a member as another one of the terminal groups does not completely include the other one of the terminal groups that shares the same terminal group as a member and is not completely included in the other one of the terminal groups that shares the same terminal group as a member;

(d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three;

(e) determining for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes;

(f) determining an individual decryption key for each determined combination pattern and storing the determined decryption key in correspondence with the parent node;

(g) storing an individual decryption key in correspondence with each node in the lowest level;

(h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes;

(i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined;

(j) determining, for each terminal, a decryption key group based on the corresponding decryption key and decryption keys corresponding with each terminal group in which the terminal is included, as a decryption key group to be assigned to the terminal, respectively;

(k) determining for each terminal, the corresponding decryption key and all decryption keys corresponding with all terminal groups that include the terminal, as the decryption key group to be assigned to the terminal; and (l) determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern.

6. A decryption terminal system including three or more terminals for obtaining encrypted data and decrypting the obtained encrypted data, each terminal comprising:

a non-transitory storage device storing a program, the program being executable by at least one processor;

a decryption key group storage unit for storing a decryption key group including decryption keys that has been individually assigned to the terminal according to a predetermined key assignment method, the decryption key group storage unit being a non-transitory storage device;

an encrypted data obtaining unit for obtaining encrypted data; and a decryption unit for decrypting the obtained encrypted data using one of the stored decryption keys, wherein the predetermined key assignment method comprises:

(a) determining two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member, (b) determining correspondence between one or more decryption keys individually and each terminal and each determined terminal group, (c) determining the terminal groups so that at least one terminal group exists that completely includes the two or more terminal groups, and so that any one of the terminal groups within the two or more terminal groups that shares a same terminal group as a member as another one of the terminal groups does not completely include the other one of the terminal groups that shares the same terminal group as a member and is not completely included in the other one of the terminal groups that shares the same terminal group as a member, (d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three, (e) determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes, (f) determining an individual decryption key for each determined combination pattern and storing the determined decryption key in correspondence with the parent node, (g) storing an individual decryption key in correspondence with each node in the lowest level, (h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes, (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined, (j) assigning, to each terminal, the decryption key group, where the decryption key group is based on the decryption key determined in correspondence with the terminal and decryption keys determined in correspondence with all terminal groups that include the terminal, (k) assigning to each terminal, the corresponding decryption key and all decryption keys corresponding with all terminal groups that include the terminal, as the decryption key group to be assigned to the terminal, and (l) assigning decryption keys to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern.

7. The decryption terminal system of claim 6, wherein the encrypted data obtaining unit is operable to obtain the encrypted data by reading the encrypted data from a data recording medium.

8. The decryption terminal system of claim 7, wherein
the data recording medium has recorded thereon encryption key designation information for designating at least one encryption key;
each terminal further includes:
a random number generation unit for generating key data that is a random number;
a content storage unit for storing digital content that is a digital work;
an encryption key selection unit for reading the encryption key designation information from the data recording medium, and selecting the at least one encryption key designated by the encryption key designation information, from an encryption key group that corresponds to the stored decryption key group;

a key data encryption unit for generating an encrypted data group by encrypting the generated key data successively by using all of the at least one selected encryption keys, and recording the encrypted key data group on the data recording medium; and a content encryption unit for generating encrypted content data by encrypting a stored content data by using the generated key data, and recording the encrypted content data on the data recording medium, wherein the encryption data obtaining unit is operable to obtain the recorded encrypted key data and the recorded encrypted content data, the decryption unit is operable to obtain key data by decrypting the obtained encrypted key data by using one of the stored decryption keys, and each terminal further includes a content decryption unit for decrypting the obtained encrypted content data by using the generated key data.

9. The decryption terminal system of claim 6, wherein
the encrypted data has been transmitted from an external transmission device, and
the encrypted data obtaining unit is operable to obtain the encrypted data by receiving the encrypted data.

10. An encryption key designation device that designates one or more encryption keys to be used in encrypting distribution data that is distributed to three or more terminals, the encryption key designation device comprising:

a non-transitory storage device storing a program, the program being executable by at least one processor;

a decryption key setting unit configured for:

(a) determining two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member, and (b) determining correspondence between one or more decryption keys individually and each terminal and each determined terminal group, (c) determining the terminal groups so that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member, (d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three, (e) determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes;

(f) determining an individual decryption key for each determined combination pattern and storing the determined decryption key in correspondence with the parent node;

(g) storing an individual decryption key in correspondence with each node in the lowest level, (h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes, and (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined; and a decryption key group correspondence unit configured for:

(a) determining, for each terminal, a decryption key group based on the decryption key determined in correspondence with the terminal and decryption keys determined in correspondence with all terminal groups that include the terminal, respectively;

(b) determining for each terminal, the corresponding decryption key and all decryption keys corresponding with all terminal groups that include the terminal, as the decryption key group to be assigned to the terminal, and (c) determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern;

an invalid terminal designation unit for designating one or more terminals as invalid terminals; and an encryption key designation unit for, when all the decryption keys corresponding with the terminals, other than decryption keys assigned to the one or more invalid terminals, are prescribed as valid decryption keys, repeatedly selecting an assigned valid decryption key for the most terminals not designated as invalid terminals until all terminals not designated as invalid terminals have been assigned a selected valid decryption key, and designating encryption keys that respectively correspond to all of the valid decryption keys that are selected as a result of the repeated selection.

11. The encryption key designation device of claim 10, wherein
the encryption key designation unit is operable to, for the N-ary tree structure, prescribe all nodes from which a node on the lowest level that corresponds to an invalid terminal is reached as invalid nodes, perform encryption key designation processing first with a node on a highest level as a processing target node, and repeatedly perform the encryption key designation processing until all processing target nodes have been processed; and
the encryption key designation unit is operable to perform the encryption key designation processing on one processing target node at a time that has not been processed, that comprises:
(i) when a combination pattern exists that relates to a combination that includes all nodes, other than invalid nodes, one level below the processing target node, designating an encryption key that corresponds to the decryption key stored by the decryption key setting unit in correspondence with the combination pattern, and if one or more invalid nodes exists one level below the processing target node, and the one level below the processing target node is not the lowest level, making all of the one or more invalid nodes that are one level below the processing target node processing target nodes, and
(ii) when a combination pattern does not exist that relates to a combination including all nodes, other than invalid nodes, one level below the processing target node, designating encryption keys stored in correspondence with all the nodes, other than the invalid nodes, by the decryption key setting unit in the level one level below if one level below is a lowest level, and if one level below is not the lowest level, making all the nodes that are one level below the processing target node processing target nodes.

12. The encryption key designation device of claim 11, wherein
the encryption key designation unit is operable to, for the N-ary tree structure, prescribe all nodes that are reached from a node on the lowest level of the N-ary tree structure that corresponds to an invalid terminal as invalid nodes, and after designating, for each node, excluding the nodes on the lowest level, invalidation information that shows whether or not the N nodes that are one level below and are reached from the node are invalid nodes, perform the encryption key designation processing,
the encryption key designation unit is operable to perform the encryption key designation processing on one processing target node at a time that has not been processed that comprises:
(a) when invalidation pattern information exists that matches invalidation information designated for the processing target node, designating an encryption key that corresponds to the decryption key stored by the decryption key setting unit in correspondence with the invalidation pattern information, and if an invalid node exists one level below the processing target node, and the one level below the processing target node is not the lowest level, making all invalid nodes that are one level below the processing target node processing target nodes, and
(b) when invalidation pattern information does not exist that matches invalidation information designated for the processing target node, designating encryption keys corresponding to the decryption keys stored by the decryption key setting unit in correspondence with all the nodes, other than the invalid nodes, in the level that is one level below if the one level below is the lowest level, and if the one level below is not the lowest level, making all the nodes that are one level below the processing target node processing target nodes.

13. The encryption key designation device of claim 11, wherein
the decryption key setting unit is operable to determine the plurality of combination patterns for each node, excluding the nodes on the lowest level, for the N-ary tree structure, by prescribing combination patterns so that each combination pattern corresponds to one of all combinations of all N of the nodes and N−1 of the N nodes that are one level below and are reached from the each node constituting a parent node of the N nodes; and
the decryption key setting unit is operable to store the determined decryption keys in correspondence with the parent node.

14. An encryption device for encrypting distribution data that is to be distributed to three or more terminals, the encryption device comprising:
a non-transitory storage device storing a program, the program being executable by at least one processor;
a decryption key setting unit configured for:
(a) determining two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member, and
(b) determining correspondence of one or more decryption keys individually and each terminal and each determined terminal group,
(c) determining the terminal groups so that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member,
(d) determining the terminal groups so that each terminal group includes three or more terminals as members, and so that a terminal group exists that contains three or more terminal groups, and
when each terminal is corresponding with a node on a lowest level in an N-ary tree structure having a plurality of hierarchies, where N is a natural number equal to or greater than three,
(e) determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes,
(f) determining an individual decryption key for each determined combination pattern and storing the determined decryption key in correspondence with the parent node, (g) storing an individual decryption key in correspondence with each node in the lowest level, (h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes, and (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined; and a decryption key group correspondence unit configured for:

(a) determining for each terminal, a decryption key group based on the decryption key determined in correspondence with the terminal and decryption keys determined in correspondence with all terminal groups that include the terminal, respectively, (b) determining for each terminal, the corresponding decryption key and all decryption keys corresponding with all terminal groups that include the terminal, as the decryption key group to be assigned to the terminal, and (c) determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below the each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern;

an invalid terminal designation unit for designating one or more terminals as invalid terminals;

an encryption key designation unit for, when all the decryption keys corresponding with the terminals, other than decryption keys assigned to the one or more invalid terminals, are prescribed as valid decryption keys, repeatedly selecting an assigned valid decryption key for the most terminals not designated as invalid terminals until all terminals not designated as invalid terminals have been assigned a selected valid decryption key, and designating encryption keys that respectively correspond to all of the valid decryption keys that are selected as a result of the repeated selection;

an encryption unit for encrypting the distribution data successively by using all designated encryption keys, so as to generate an encrypted distribution data group; and an output unit for outputting the generated encrypted distribution data externally from the encryption device.

15. The encryption device of claim 14, wherein the output unit is operable to externally output key designation information for identifying each encryption key designated by the encryption key designation unit, together with the encrypted distribution data group.

16. The encryption device of claim 14, further comprising:
a content storage unit for storing content data that is a digital work;
a random number generation unit for generating the distribution data, the distribution data being a random number; and
a content encryption unit for encrypting the content data by using the generated distribution data as a key, so as to generate encrypted content data,
wherein the output unit is operable to externally output the generated encrypted content data together with the encrypted distribution data group.

17. The encryption device of claim 14, wherein the output unit is operable to record the encrypted distribution data group to a data recording medium.

18. The encryption device of claim 14, wherein the output unit is operable to transmit the encrypted distribution data group to each terminal.

19. An encryption key designation method that designates an encryption key to be used in encrypting distribution data that is distributed to three or more terminals, the encryption key designation method comprising:

in a decryption key setting unit:

(a) determining two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member;

(b) determining one or more decryption keys individually in correspondence with each terminal and each determined terminal group;

(c) determining the terminals groups so that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member;

(d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three;

(e) determining for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes;

(f) determining an individual decryption key for each determined combination pattern and storing the determined decryption key in correspondence with the parent node;

(g) storing an individual decryption key in correspondence with each node in the lowest level;

(h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes; and (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined; and in a decryption key group correspondence unit:

(a) determining for each terminal, a decryption key group based on, in addition to the decryption key corresponding with the terminal, decryption keys prescribed in correspondence with all terminal groups that include the terminal, respectively;

(b) determining for each terminal, the corresponding decryption key and all decryption keys corresponding with all terminal groups that include the terminal, as the decryption key group to be assigned to the terminal; and (c) determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern;

designating one or more terminals as invalid terminals; and when all the decryption keys corresponding with the terminals, other than decryption keys assigned to the one or more invalid terminals, are prescribed as valid decryption keys, repeatedly selecting an assigned valid decryption key for the most terminals not designated as invalid terminals until all terminals not designated as invalid terminals have been assigned a selected valid decryption key, and designating encryption keys that respectively correspond to all of the valid decryption keys that are selected as a result of the repeated selection.

20. A non-transitory computer-readable recording medium storing a program for causing a computer to execute a designation processing that designates one or more encryption keys to be used in encrypting distribution data that is distributed to three or more terminals, the designation processing comprising:

(a) determining two or more terminal groups, which are groups having two or more terminals as members, so that each of the terminals is a member of at least one of the terminal groups, and any one of the terminal groups that shares a terminal as a member with another one of the terminal groups does not completely include the other one of the terminal groups sharing the terminal as a member and is not completely included in the other one of the terminal groups sharing the terminal as a member;

(b) determining one or more decryption keys individually in correspondence with each terminal and each determined terminal group;

(c) determining the terminals groups so that at least one terminal group exists that completely includes the two or more terminal groups, and so that any one of the terminal groups within the two or more terminal groups that shares a same terminal group with a member with another one of the terminal groups does not completely include the other one of the terminal groups that shares the same terminal group as a member and is not completely included in the other one of the terminal groups that shares the same terminal group as a member;

(d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three;

(e) determining for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes;

(f) determining an individual decryption key for each determined combination pattern and storing the determined decryption key in correspondence with the parent node;

(g) storing an individual decryption key in correspondence with each node in the lowest level;

(h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes;

(i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined;

(j) determining for each terminal, a decryption key group based on, in addition to the decryption key corresponding with the terminal, decryption keys prescribed in correspondence with all terminal groups that include the terminal, respectively;

(k) determining for each terminal, the corresponding decryption key and all decryption keys corresponding with all terminal groups that include the terminal, as the decryption key group to be assigned to the terminal;

(l) determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal;

(m) designating one or more terminals as invalid terminals; and (n) when all the decryption keys corresponding with the terminals, other than decryption keys assigned to the one or more invalid terminals, are prescribed as valid decryption keys, repeatedly selecting an assigned valid decryption key for the most terminals not designated as invalid terminals until all terminals not designated as invalid terminals have been assigned a selected valid decryption key, and designating encryption keys that respectively correspond to all of the valid decryption keys that are selected as a result of the repeated selection.

21. A decryption terminal that obtains encrypted data and decrypts the obtained encrypted data, the decryption terminal comprising:

a non-transitory storage device storing a program, the program being executable by at least one processor;

a decryption key group storage unit for storing a decryption key group that has been individually assigned to the decryption terminal according to a predetermined key assignment method, the decryption key group storage unit being a non-transitory storage device;

an encrypted data obtaining unit for obtaining encrypted data; and a decryption unit for decrypting the obtained encrypted data by using one of the stored decryption keys, wherein the predetermined key assignment method, when there are three or more terminals including the decryption terminal, comprises:

(a) determining two or more terminal groups so that the decryption terminal belongs to a plurality of terminal groups, where each of the plurality of terminal groups includes two or more terminals as members, and the plurality of terminal groups exist so that a terminal group that includes the decryption terminal as a member does not completely include another one of the plurality of terminal groups and is not completely included in another one of the plurality of terminal groups, (b) determining one or more individual decryption keys in correspondence with the decryption terminal and in correspondence with each determined terminal group, (c) determining the terminal groups so that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member, (d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three, (e) determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes, (f) determining an individual decryption key for each determined combination pattern and storing the determined decryption key in correspondence with the parent node, (g) storing an individual decryption key in correspondence with each node in the lowest level, (h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes, (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined, (j) assigning, to the decryption terminal, a decryption key group based on the one or more individual decryption keys determined in correspondence with the decryption terminal and one or more individual decryption keys determined in correspondence with all the terminal groups that include the decryption terminal, (k) assigning to each terminal, the corresponding decryption key and all decryption keys corresponding with all terminal groups that include the terminal, as the decryption key group to be assigned to the terminal, and (l) assigning decryption keys to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern.

22. A decryption terminal that obtains encrypted data and decrypts the obtained encrypted data, the decryption terminal comprising:
a non-transitory storage device storing a program, the program being executable by at least one processor;
a decryption key group storage unit for storing a decryption key group that has been individually assigned to the decryption terminal according to a predetermined key assignment method, the decryption key group storage unit being a non-transitory storage device;
an encrypted data obtaining unit for obtaining encrypted data; and
a decryption unit for decrypting the obtained encrypted data by using one of the stored decryption keys,
wherein the predetermined key assignment method comprises:
(a) determining two or more terminal groups so that the decryption terminal belongs to a plurality of terminal groups, where each of the plurality of terminal groups includes two or more terminals as members, and the plurality of terminal groups exist so that a terminal group that includes the decryption terminal as a member does not completely include another one of the plurality of terminal groups and is not completely included in another one of the plurality of terminal groups,
(b) determining one or more individual decryption keys in correspondence with the decryption terminal and in correspondence with each determined terminal group,
(c) determining the terminal groups so that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member,
(d) determining the terminal groups so that each terminal group includes three or more terminals as members, and so that a terminal group exists that contains three or more terminal groups, and
when each terminal is corresponding with a node on a lowest level in an N-ary tree structure having a plurality of hierarchies, where N is a natural number equal to or greater than three,
(e) determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes,
(f) determining an individual decryption key for each determined combination pattern and storing the determined decryption key in correspondence with the parent node,
(g) storing an individual decryption key in correspondence with each node in the lowest level,
(h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes,
(i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined,
(j) assigning, to the decryption terminal, a decryption key group based on the one or more individual decryption keys determined in correspondence with the decryption terminal and one or more individual decryption keys determined in correspondence with all the terminal groups that include the decryption terminal,
(k) assigning to each terminal, the corresponding decryption key and all decryption keys corresponding with all terminal groups that include the terminal, as the decryption key group to be assigned to the terminal, and
(l) assigning decryption keys to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal,
wherein the terminal groups have a one-to-one correspondence with the combination patterns, and each terminal group is a group whose members are all the terminals that correspond to all nodes on the lowest level that are reached from all the combined nodes in the corresponding combination pattern,
(m) determining, for each node other than leaves in an N-ary tree structure that has a plurality of hierarchies and whose leaves are in one-to-one correspondence with a plurality of decryption terminals that includes the decryption terminal, a plurality of combination patterns that each combine at least two of N nodes that are one level below and are reached from the each node constituting a parent node of the N nodes, deciding an individual decryption key for each determined combination pattern, and corresponding the determined decryption keys with the parent node, where N is a natural number equal to or greater than three,
(n) designating, for each node, other than a leaf, on a path from the leaf corresponding to the decryption terminal to a root of the N-ary tree structure, from among the decryption keys corresponded with the node by the first procedure, decryption keys that correspond to all the combination patterns that relate to combinations that include a node that is one level below the node on the path,
(o) assigning the designated decryption keys to said decryption terminal.

23. A non-transitory computer-readable recording medium having stored thereon a plurality of pieces of encrypted distribution data that have been generated by using each of a plurality of encryption keys to encrypt distribution data that is distributed to three or more terminals, the plurality of encryption keys having been designated by designation processing, the designation processing comprising:
- (a) determining two or more terminal groups so that the decryption terminal belongs to a plurality of terminal groups, where each of the plurality of terminal groups includes two or more terminals as members, and the plurality of terminal groups exist so that a terminal group that includes the decryption terminal as a member does not completely include another one of the plurality of terminal groups and is not completely included in another one of the plurality of terminal groups;
- (b) determining one or more individual decryption keys in correspondence with the decryption terminal and in correspondence with each determined terminal group;
- (c) determining the terminal groups so that at least one terminal group exists that completely includes the two or more terminal groups, and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member;
- (d) determining the terminal groups so that each terminal group includes three or more terminals as members, and so that a terminal group exists that contains three or more terminal groups, and when each terminal is corresponding with a node on a lowest level in an N-ary tree structure having a plurality of hierarchies, where N is a natural number equal to or greater than three;
- (e) determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes;
- (f) determining an individual decryption key for each determined combination pattern and storing the determined decryption key in correspondence with the parent node;
- (g) storing an individual decryption key in correspondence with each node in the lowest level;
- (h) determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes;
- (i) storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined;
- (j) assigning, to the decryption terminal, a decryption key group based on the one or more individual decryption keys determined in correspondence with the decryption terminal and one or more individual decryption keys determined in correspondence with all the terminal groups that include the decryption terminal;
- (k) assigning to each terminal, the corresponding decryption key and all decryption keys corresponding with all terminal groups that include the terminal, as the decryption key group to be assigned to the terminal;
- (l) assigning decryption keys to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below each node on the same path, and (2) the decryption key stored in the decryption key setting unit in correspondence with the terminal, wherein the terminal groups have a one-to-one correspondence with the combination patterns, and each terminal group is a group whose members are all the terminals that correspond to all nodes on the lowest level that are reached from all the combined nodes in the corresponding combination pattern;
- (m) determining, for each node, other than leaves, in an N-ary tree structure that has a plurality of hierarchies and whose leaves are in one-to-one correspondence with the terminals, a plurality of combination patterns that each combine at least two of N nodes that are one level below and are reached from the each node constituting a parent node of the N nodes, deciding an individual decryption key for each determined combination pattern, and corresponding the determined decryption keys with the parent node, where N is a natural number equal to or greater than three;
- (n) designating, for each terminal, decryption keys to each node, other than a leaf, on a path from the leaf corresponding to the terminal to a root of the N-ary tree structure, the decryption keys being from among the decryption keys corresponded with the node by the decryption key correspondence step and corresponding to all the combination patterns that relate to combinations that include a node that is one level below the node on the path, and corresponding all the designated decryption keys with the terminal;
- (o) designating one or more terminals as invalid terminals; and
- (p) when all the decryption keys assigned to the terminals, other than decryption keys assigned to the one or more invalid terminals, are prescribed as valid decryption keys, repeatedly selecting an assigned valid decryption key that is in correspondence with the most terminals not designated as invalid terminals until all terminals not designated as invalid terminals have been assigned a selected valid decryption key, and designating encryption keys that correspond to all of the valid decryption keys that are selected as a result of the repeated selection.

24. A decryption key determining device that determines decryption key groups for use in decryption to be individually assigned to at least three terminals that obtain encrypted data and decrypt the obtained encrypted data, the decryption key determining device comprising:

a non-transitory storage device storing a program, the program being executable by at least one processor;

a decryption key setting unit configured for:

determining two or more terminal groups. which are groups having two or more terminals as members, so that each of the terminals is a member of at least one of the terminal groups. and any one of the terminal groups that shares a terminal as a member with another one of the terminal groups does not completely include the other one of the terminal groups sharing the terminal as a member and is not completely included in the other one of the terminal groups haring the terminal as a member, determining the terminal groups so that at least one terminal group exists that completely includes the two or more terminal groups. and so that any one of the terminal groups within the two or more terminal groups that shares a same terminal group as a member with another one of the terminal groups does not completely include the other one of the terminal groups that shares the same terminal group as a member and is not completely included in the other one of the terminal groups that shares the same terminal group as a member, when each terminal is corresponding with a node on a lowest level in an N-ary tree structure having a plurality of hierarchies, where N. is a natural number equal to or greater than three, determining, for each node other than the nodes on the lowest level, a plurality of combination patterns, for each one of N nodes that are reached from each node constituting a parent node of the one of the N nodes, that are combinations of two or more of the N nodes including the one of the N nodes, and that include a combination of all of the N nodes, and determining an individual decryption key for each determined combination pattern and storing the determined decryption key in correspondence with the parent node, and storing an individual decryption key in correspondence with each node in the lowest level, determining the plurality of combination patterns for each node excluding the nodes on the lowest level in the N-ary tree structure by prescribing combination patterns so that each combination pattern corresponds to one of all combinations of two or more of the N nodes that are one level below and are reached from the each node constituting a parent node of the N nodes, and storing, in correspondence with the parent node, all combination patterns determined for the parent node as invalidation pattern information that is made by connecting values in a predetermined order, each value showing whether or not one of the N nodes that are reached from the parent node is a target of combination, deciding an individual decryption key for each invalidation pattern information, and storing the individual decryption key in correspondence with the parent node and the invalidation information for which the individual decryption key has been determined; and a decryption key group correspondence unit configured for:

determining, for each terminal, a decryption key group based on the corresponding decryption key and the decryption keys corresponding with each terminal group in which the terminal is include, as a decryption key group to the assigned to the terminal, respectively, and determining decryption keys to be assigned to each terminal, the decryption keys being (1) decryption keys selected from among the decryption keys stored in the decryption key setting unit in correspondence with each node on a same path, which is a path from the node corresponding to the terminal on the lowest level to a node on a highest level, excluding the node that corresponds to the terminal, and corresponding with all of the combination patterns that include a node that is one level below the each node on the same path, and (2) the decryption key stored in the decryption key setting unit in correspondence with the terminal.

* * * * *